US007248786B2

(12) United States Patent
Kato et al.

(10) Patent No.: US 7,248,786 B2
(45) Date of Patent: Jul. 24, 2007

(54) VIDEO SIGNAL PROCESSING APPARATUS, VIDEO SIGNAL PLAYBACK APPARATUS, AND VIDEO SIGNAL RECORDING APPARATUS

(75) Inventors: Motoki Kato, Kanagawa (JP); Masanobu Nakamura, Tokyo (JP); Katsumi Muramatsu, Tokyo (JP)

(73) Assignee: Sony Corporation (JP)

( * ) Notice: Subject to any disclaimer, the term of this patent is extended or adjusted under 35 U.S.C. 154(b) by 996 days.

(21) Appl. No.: 10/416,659

(22) PCT Filed: Sep. 17, 2002

(86) PCT No.: PCT/JP02/09492

§ 371 (c)(1),
(2), (4) Date: May 14, 2003

(87) PCT Pub. No.: WO03/026290

PCT Pub. Date: Mar. 27, 2003

(65) Prior Publication Data

US 2004/0027393 A1 Feb. 12, 2004

(30) Foreign Application Priority Data

Sep. 18, 2001 (JP) ............................. 2001-283469

(51) Int. Cl.
*H04N 5/91* (2006.01)
(52) U.S. Cl. ...................................... 386/95
(58) Field of Classification Search .................. 386/25, 386/46, 52, 95, 125; 709/225–229, 2; 713/168–176
See application file for complete search history.

(56) References Cited

U.S. PATENT DOCUMENTS 5,621,579 A 4/1997 Yuen (Continued)

FOREIGN PATENT DOCUMENTS

EP 0 951 021 A2 10/1999

(Continued)

OTHER PUBLICATIONS

Bloom, J. A. et al., "Copy Protection for DVD Video", Proceedings of the IEEE, vol. 87, No. 7, Jul. 1999, pp. 1267-1276.

(Continued)

*Primary Examiner*—James J. Groody
*Assistant Examiner*—Mishawn Dunn
(74) *Attorney, Agent, or Firm*—Lerner, David, Littenberg, Krumholz & Mentlik, LLP

(57) ABSTRACT

A video signal processing apparatus, a video signal playback apparatus, and a video signal recording apparatus are presented for preventing illegal copying of thumbnail images. For example, a thumbnail encoder generates a thumbnail image of a video signal input from a terminal. A macrovision detector, a CGMS detecting/updating unit, and a WM (watermark) detecting/updating unit detect an analog copy protection signal (APS), a CGMS signal as copy generation management information, and watermark, respectively, of the video signal input from the terminal, and outputs them to a controller. The controller generates copy control information of the thumbnail image based on the input copy control information. The thumbnail image and the copy control information thereof are recorded in an information recording medium. This may be applied to a recording apparatus for recording data into an information recording medium and to a playback apparatus for playing back data recorded in an information recording medium.

40 Claims, 21 Drawing Sheets

U.S. PATENT DOCUMENTS 6,148,140 A * 11/2000 Okada et al. ............... 386/105
6,285,826 B1 * 9/2001 Murase et al. .............. 386/125
6,330,392 B1 * 12/2001 Nakatani et al. ............. 386/52

FOREIGN PATENT DOCUMENTS

| | | |
|---|---|---|
| JP | 9-275523 A1 | 10/1997 |
| JP | 2000-13720 A1 | 1/2000 |
| JP | 2002-209164 A1 | 7/2002 |

OTHER PUBLICATIONS

Cox, I.J. et al., "Some General Methods for Tampering with Watermarks", IEEE Journal on Selected Areas in Communications, vol. 16, No. 4, May 1998, pp. 587-593.

* cited by examiner

FIG. 10

| Syntax | No. of bits | Mnemonic |
|---|---|---|
| UIAppInfoDVR() { | | |
|     ref_to_menu_thumbnail_index | 16 | uimsbf |
| } | | |

FIG. 11

| Syntax | No. of bits | Mnemonic |
|---|---|---|
| PlayListMark() { | | |
|     number_of_PlayList_marks | 16 | uimsbf |
|     for(i=0; i <number_of_PlayList_marks; i++){ | | |
|         mark_type | 7 | uimsbf |
|         ref_to_PlayItem_id | 16 | uimsbf |
|         mark_time_stamp | 32 | uimsbf |
|         if(mark_type=="Representative picture of PlayList"){ | | |
|             ref_to_menu_thumbnail_index | 16 | uimsbf |
|         } else { | | |
|             ref_to_mark_thumbnail_index | 16 | uimsbf |
|         } | | |
|     } | | |
| } | | |

FIG. 12

| Syntax | No. of bits | Mnemonic |
|---|---|---|
| ClipMark() { | | |
|     number_of_Clip_marks | 16 | uimsbf |
|     for(i=0; i <number_of_Clip_marks; i++){ | | |
|         mark_type | 7 | uimsbf |
|         ref_to_STC_id | 8 | uimsbf |
|         mark_time_stamp | 32 | uimsbf |
|         ref_to_mark_thumbnail_index | 16 | uimsbf |
|     } | | |
|   } | | |
| } | | |

FIG. 13

| Syntax | No. of bits | Mnemonic |
|---|---|---|
| menu.tidx / mark.tidx { | | |
|     number_of_thumbnails | 16 | uimsbf |
|     tn_block_size | | |
|     number_of_tn_blocks | 16 | uimsbf |
|     for(i=0; i<number_of_thumbnails; i++){ | | |
|         thumbnail_index | 16 | uimsbf |
|         ref_to_tn_block_id | 16 | uimsbf |
|         picture_byte_size[ref_to_tn_block_id] | 32 | uimsbf |
|         horizontal_picture_size[ref_to_tn_block_id] | 16 | uimsbf |
|         vertical_picture_size[ref_to_tn_block_id] | 16 | uimsbf |
|     } | | |
| } | | |

| Syntax | No. of bits | Mnemonic |
|---|---|---|
| menu.tdat / mark.tdat { | | |
|   for(tn_block_id=0; tn_block_id<number_of_ tn_blocks; tn_block_id ++){ | | |
|     tn_block(*tn_block_id* ) | tn_block_ size*1024*8 | |
|   } | | |
| } | | |

FIG. 16

| Syntax | No. of bits | Mnemonic |
|---|---|---|
| tn_block(tn_block_id) { | | |
|     thumbnail_picture[tn_block_id] | picture_byte_size[tn_block_id]*8 | bslbf |
|     CP_Info_thumbnail() | N1*8 | bslbf |
|     if (i=0; i<NP; i++) { | | |
|         padding_byte | 8 | bslbf |
|     } | | |
| } | | |

FIG. 17

| Syntax | No. of bits | Mnemonic |
|---|---|---|
| CP Info thumbnail() { | | |
|     CCI_thumbnail | 2 | uimsbf |
|     APS_thumbnail | 2 | uimsbf |
|     flag_need_AVstreamInfo | 1 | uimsbf |
|     reserved | 4 | |
|     Integrity_Check_Value | N2 | uimsbf |
| } | | |

FIG. 18

| CCI_thumbnail | meaning |
|---|---|
| 00 | copy free |
| 01 | no more copy |
| 10 | copy once |
| 11 | copy prohibited |

FIG. 19

| APS_thumbnail | meaning |
|---|---|
| 00 | copy free |
| 01 | APS is on : Type 1 (AGC) |
| 10 | APS is on : Type 2 (AGC+2L Colorstripe) |
| 11 | APS is on : Type 3 (AGC+4L Colorstripe) |

FIG. 20

| flag_need_AVstreamInfo | meaning |
|---|---|
| 1 | NECESSARY TO REFER TO CONTENT PROTECTION INFORMATION IN CLIP AV STREAM |
| 0 | NOT NECESSARY TO REFER TO CONTENT PROTECTION INFORMATION IN CLIP AVSTREAM |

FIG. 21

| Syntax | No. of bits | Mnemonic |
|---|---|---|
| menu.tidx / mark.tidx { | | |
|     number_of_thumbnails | 16 | uimsbf |
|     number_of_tn_blocks | 16 | uimsbf |
|     for(i=0; i<*number_of_thumbnails;* i++){ | | |
|         thumbnail_index | 16 | uimsbf |
|         ref_to_tn_block_id | 16 | uimsbf |
|         picture_byte_size*[ref_to_tn_block_id]* | 32 | uimsbf |
|         Horizontal_picture_size*[ref_to_tn_block_id]* | 16 | uimsbf |
|         vertical_picture_size*[ref_to_tn_block_id]* | 16 | uimsbf |
|         *CP_Info_thumbnail()* | | |
|     } | | |
| } | | |

FIG. 23

| STATE OF INPUT SIGNAL | | STATE OF RECORDED AV STREAM AND THUMBNAIL | | | | |
|---|---|---|---|---|---|---|
| CGMS | WM | CCI_o | WM_o | E_CCI | CCI_thumbnail | APS_thumbnail |
| 00 | 00 | 00 | 00 | 00 | 00 | 00 |
| 01 | 101 | NOT RECORDABLE | | | | |
| 10 | 10 | 01 | 101 | 01 | 01 | 00 |
| 11 | 11 | NOT RECORDABLE | | | | |

00 :         copy free
01, 101:  no more copy
10 :         copy once
11 :         copy prohibited

FIG. 24

| STATE OF INPUT SIGNAL | | | STATE OF RECORDED AV STREAM AND THUMBNAIL | | | | |
|---|---|---|---|---|---|---|---|
| E_CCI | APS | WM | CCI_o | WM_o | E_CCI | CCI_thumbnail | APS_thumbnail |
| 00 | * | 00 | 00 | 00 | 00 | 00 | THE SAME STATE AS THE INPUT SIGNAL |
| 01 | * | 101 | NOT RECORDABLE | | | | |
| 10 | * | 10 | 01 | 101 | 01 | 01 | THE SAME STATE AS THE INPUT SIGNAL |
| 11 | * | 11 | NOT RECORDABLE | | | | |

VIDEO SIGNAL PROCESSING APPARATUS, VIDEO SIGNAL PLAYBACK APPARATUS, AND VIDEO SIGNAL RECORDING APPARATUS

CROSS-REFERENCE TO RELATED APPLICATIONS

This application is a U.S. national stage application of International Application No. PCT/JP02/09492, filed on Sep. 17, 2002, which has designated the U.S. and claims priority to Japan Patent Application No. 2001-283469 filed on Sep. 18, 2001.

TECHNICAL FIELD

The present invention relates to video signal processing apparatuses, video signal playback apparatuses, and video signal recording apparatuses. More particularly, the invention relates to a video signal processing apparatus, a video signal playback apparatus, and a video signal recording apparatus in which security information of video signals recorded in information recording media can be suitably controlled.

BACKGROUND ART

Various optical discs are being proposed. As disk-type information recording media which are detachable from recording/playback apparatuses. Such recordable optical discs are proposed as large-capacity media having a few gigabytes, and it is highly expected that they can be used as media for recording digital video (moving pictures) signals.

One of the coding methods for digital-compressing digital video signals is the MPEG (Moving Picture Experts Group) 2 method. MPEG2 is also used when recording digital video signals in information recording media. For example, when recording analog video signals in information recording media, the video signals are encoded by the MPEG2 method, and are recorded in the information recording media as an encoded bit stream. In digital TV (television) broadcasting, which has recently started, a video program encoded by the MPEG2 method is transmitted in a format referred to as a transport stream. When recording digital-broadcasting AV signals in information recording media, a transport stream is recorded as a digital signal without being decoded or re-encoded.

Video signals recorded in an information recording medium in a digital signal format can be copied into another information recording medium without the slightest loss of quality. However, this is a great problem for copyright holders of the video content.

From this point of view, for restricting copies of video signals, CCI (Copy Control Information) indicating copy generation management information, such as "Copy Free (copying can be made)", "Copy Once (copying can be made only for one generation)", "No More Copy (copying can no longer be made), and "Copy Prohibited (copying is not allowed)", is added to the video signals. Such signals include, for example, CGMS (Copy Generation Management System) signals. CGMS signals for analog interfaces are referred to as "CGMS-A", and CGMS signals for digital interfaces are referred to as "CGMS-D". Analog CGMS-A, which is formed by superimposing ID on VBI (Vertical Blanking Interval) of video signals, is also referred to as "VBID". The VBID is standardized as EIAJ CP-1204.

For transmitting a transport stream having CCI embedded therein, a method for encoding a descriptor having this information is known. This type of descriptor includes DTCP descriptor defined by DTLA (Digital Transmission Licensing Administrator) and digital_copy_control_descriptor defined by ARIB used in BS digital broadcasting in Japan. For further restricting copies, the embedding of copy generation management information as a watermark into a baseband video signal or an MPEG bit stream is being considered. The standardization of the watermark is currently being promoted, and the millennium format and the galaxy format have been proposed.

When recording a video signal into an information recording medium, it is required that recording restrictions be accurately imposed according to the CCI of the input signal. Generally, the user is able to record a video signal into an information recording medium only when the CCI of the input signal indicates "Copy Free (copying can be made)" or "Copy Once (copying can be made only for one generation)". When the CCI of the input signal indicates "Copy Once (copying can be made only for one generation)", the CCI of the video signal in the information recording medium must be updated to "No More Copy (copying can no longer be made)".

For easy understanding of the content of a video signal recorded in an information recording medium, still images, which typically represent the content, or specific scenes of the content extracted as still images are sometimes recorded separately from the video signals. These still images are referred to as thumbnail images. For example, the user selects a list of thumbnail images from the video signals recorded in the information recording medium, and displays it on a menu screen for selecting the playback start position. This makes it possible to provide a user-friendly interface. The thumbnail images may include images selected from the recorded video signals or images recorded from a personal computer or a digital still camera into the information recording medium.

Conventionally, in most cases, when predetermined video signals are copied from an information recording medium in which video signals and the corresponding thumbnail images are recorded into another information recording medium, only the video signals can be copied. In this case, however, it is more convenient for the user if the thumbnail images can be copied together with the video signals. This eliminates the need for the user to add the thumbnail images to the copied video signals later.

In this case, the management of the copyright of the thumbnail images becomes the problem. For example, many images of popular movie or television characters probably possess copyrights. Illegal copying of these images is not preferable for the copyright holders. Conventionally, however, a restriction of the copying of thumbnail images is not considered, and thus, when creating an application for copying thumbnail images together with corresponding video signals, it cannot be determined whether the thumbnail images can be copied. Thus, illegal copying of the thumbnail images cannot be prevented.

DISCLOSURE OF INVENTION

In view of the above background, it is an object of the present invention to simply and reliably prevent illegal copying of thumbnail images by suitably managing content protection information (for example, CCI) of the thumbnail images recorded in an information recording medium.

A first video signal processing apparatus of the present invention includes: generation means for generating a thumbnail image corresponding to an input video signal; first control means for generating content protection information corresponding to the thumbnail image generated by the generation means; and recording means for recording the video signal into an information recording medium together with the thumbnail image generated by the generation means and the content protection information generated by the first control means.

The content protection information may include copy generation management information.

The content protection information may include analog copy protection control information.

The generation means may generate the thumbnail image by using an image in the video signal, and the first control means may generate the content protection information of the thumbnail image based on content protection information of the image contained in the video signal.

The generation means may generate the thumbnail image by using an image in the video signal, and the first control means may generate the content protection information containing an identifier indicating whether it is necessary to refer to content protection information of the video signal.

The recording means may record the thumbnail image and the content protection information in units of blocks having a predetermined size.

The recording means may form the thumbnail image and the content protection information corresponding to the thumbnail image into a block as a pair, and records the block.

The recording means may record the thumbnail image by compressing the thumbnail image according to the JPEG method.

The aforementioned video signal processing apparatus may further include: playback means for playing back a signal recorded in the information recording medium; separation means for separating the video signal, the thumbnail image corresponding to the video signal, and the content protection information corresponding to the thumbnail image from the signal played back by the playback means; and second control means for restricting an output of the thumbnail image based on the content protection information separated by the separation means.

The content protection information may include an analog copy protection control signal, and the second control means may perform control so that a copy protection signal is superimposed on an output signal according to the analog copy protection control signal.

The second control means may further restrict a playback operation of the thumbnail image based on the content protection information of the video signal.

When the thumbnail image is copied into another information recording medium, the second control means may restrict the copying of the thumbnail image based on the content protection information recorded in and added to the thumbnail image.

The content protection information may include copy generation management information, and the second control means may restrict the copying of the thumbnail image so that restrictions of the copy generation management information of the thumbnail image are protected.

The second control means may further restrict the copying of the thumbnail image based on the content protection information of the video signal.

A first video signal processing method of the present invention includes: a generation step of generating a thumbnail image corresponding to an input video signal; a control step of generating content protection information corresponding to the thumbnail image generated by processing of the generation step; and a recording step of recording the video signal into an information recording medium together with the thumbnail image generated by processing of the generation step and the content protection information generated by processing of the control step.

A program of a first recording medium of the present invention includes: a generation step of generating a thumbnail image corresponding to an input video signal; a control step of generating content protection information corresponding to the thumbnail image generated by processing of the generation step; and a recording step of recording the video signal into an information recording medium together with the thumbnail image generated by processing of the generation step and the content protection information generated by processing of the control step.

A first program of the present invention allows a computer to execute: a generation step of generating a thumbnail image corresponding to an input video signal; a control step of generating content protection information corresponding to the thumbnail image generated by processing of the generation step; and a recording step of recording the video signal into an information recording medium together with the thumbnail image generated by processing of the generation step and the content protection information generated by processing of the control step.

A second video signal processing apparatus of the present invention includes: playback means for playing back a signal recorded in an information recording medium; separation means for separating a video signal, a thumbnail image corresponding to the video signal, and content protection information corresponding to the thumbnail image from the signal played back by the playback means; and control means for controlling an output of the thumbnail image based on the content protection information separated by the separation means.

The content protection information may include an analog copy protection control signal, and the control means may perform control so that a copy protection signal is superimposed on an output signal according to the analog copy protection control signal.

The control means may further restrict a playback operation of the thumbnail image based on the content protection information of the video signal.

When the thumbnail image is copied into another information recording medium, the control means may restrict the copying of the thumbnail image based on the content protection information recorded in and added to the thumbnail image.

The content protection information may include copy generation management information, and the control means may restrict the copying of the thumbnail image so that restrictions of the copy generation management information of the thumbnail image are protected.

The control means may further restrict the copying of the thumbnail image based on the content protection information of the video signal.

A second video signal processing method of the present invention includes: a playback step of playing back a signal recorded in an information recording medium; a separation step of separating a video signal, a thumbnail image corresponding to the video signal, and content protection information corresponding to the thumbnail image from the signal played back by processing of the playback step; and a control step of controlling an output of the thumbnail image based on the content protection information separated by processing of the separation step.

A program of a second recording medium of the present invention includes: a playback step of playing back a signal recorded in an information recording medium; a separation step of separating a video signal, a thumbnail image corresponding to the video signal, and content protection information corresponding to the thumbnail image from the signal played back by processing of the playback step; and a control step of controlling an output of the thumbnail image based on the content protection information separated by processing of the separation step.

A second program of the present invention allows a computer to execute: a playback step of playing back a signal recorded in an information recording medium; a separation step of separating a video signal, a thumbnail image corresponding to the video signal, and content protection information corresponding to the thumbnail image from the signal played back by processing of the playback step; and a control step of controlling an output of the thumbnail image based on the content protection information separated by processing of the separation step.

A video signal, a thumbnail image corresponding to the video signal, and content protection information corresponding to the thumbnail image are recorded.

The content protection information may include copy generation management information.

The content protection information may include an analog copy protection control signal.

The thumbnail image and the content protection information may be recorded in units of blocks having a predetermined size.

The thumbnail image and the content protection information corresponding to the thumbnail image may be recorded by being formed into a block as a pair.

The thumbnail image may be recorded by being compressed according to the JPEG method.

According to the first video signal processing apparatus and method, the first recording medium, and the first program of the present invention, a thumbnail image corresponding to an obtained video signal is generated, and content protection information corresponding to the generated thumbnail image is generated. The content protection information is added to the thumbnail image, and the thumbnail image is then recorded in an information recording medium.

According to the second video signal processing apparatus and method, the second recording medium, and the second program of the present invention, a video signal, a thumbnail image corresponding to the video signal, and content protection information added to the thumbnail image are extracted from a signal played back from an information processing medium, and the output of the thumbnail image is restricted based on the extracted content protection information.

According to the information recording medium of the present invention, a video signal, a thumbnail image corresponding to the video signal, and content protection information corresponding to the thumbnail image are recorded.

A video signal recording apparatus of the present invention includes: a detector operable to detect content protection information from an input video signal; an encoder operable to generate a thumbnail image signal corresponding to the video signal; a generator operable to generate copy control information of the thumbnail image signal generated by the encoder based on the content protection information detected by the detector; and a recorder operable to record the video signal, the thumbnail image signal generated by the encoder, and the copy control information generated by the generator into an information recording medium.

The video signal recording apparatus may further include an encryption unit operable to encrypt the thumbnail image signal. The recorder may record the thumbnail image signal encrypted by the encryption unit into the information recording medium.

The encryption unit may further encrypt the copy control information, and the recorder may record the copy control information encrypted by the encryption unit into the information recording medium.

According to a video signal recording method of the present invention, content protection information is detected from an input video signal, a thumbnail image signal corresponding to the video signal is generated, copy control information of the thumbnail image signal is generated based on the detected content protection information, and the video signal, the thumbnail image signal, and the copy control information are recorded into an information recording medium.

A program recorded in a third recording medium of the present invention includes: a detection step of detecting content protection information from an input video signal; a first generation step of generating a thumbnail image signal corresponding to the video signal; a second generation step of generating copy control information of the thumbnail image signal based on the content protection information detected by processing of the detection step; and a recording control step of controlling the recording of the video signal, the thumbnail image signal generated by processing of the first generation step, and the copy control information generated by processing of the second generation step into an information recording medium.

A third program of the present invention includes: a detection step of detecting content protection information from an input video signal; a first generation step of generating a thumbnail image signal corresponding to the video signal; a second generation step of generating copy control information of the thumbnail image signal based on the content protection information detected by processing of the detection step; and a recording control step of controlling the recording of the video signal, the thumbnail image signal generated by processing of the first generation step, and the copy control information generated by processing of the second generation step into an information recording medium.

A video playback apparatus of the present invention includes: a playback unit operable to play back a video signal, a thumbnail image signal corresponding to the video signal, and copy control information of the thumbnail signal from an information recording medium; and an output unit operable to add a copy control signal to the thumbnail image signal based on the copy control information played back by the playback unit so as to output the thumbnail image signal with the copy control signal.

The video playback apparatus may further include an encryption decoder operable to decode the thumbnail image signal, which is encrypted, and the thumbnail image signal played back by the playback unit may be encrypted.

The copy control information played back by the playback unit may be encrypted, and the encryption decoder may further decode the encrypted copy control information.

According to a video signal playback method of the present invention, a video signal, a thumbnail image signal corresponding to the video signal, and copy control information of the thumbnail signal are played back from an information recording medium, and a copy control signal is added to the thumbnail image signal based on the played-back copy control information so as to output the thumbnail image signal with the copy control signal.

A program of a fourth recording medium of the present invention includes: a playback control step of controlling a playback operation of a video signal, a thumbnail image signal corresponding to the video signal, and copy control information of the thumbnail signal from an information recording medium; and an output control step of controlling an output of information obtained by adding a copy control signal to the thumbnail image signal based on the copy control information which is controlled to be played back by processing of the playback control step.

A fourth program of the present invention includes: a playback control step of controlling a playback operation of a video signal, a thumbnail image signal corresponding to the video signal, and copy control information of the thumbnail signal from an information recording medium; and an output control step of controlling an output of information obtained by adding a copy control signal to the thumbnail image signal based on the copy control information which is controlled to be played back by processing of the playback control step.

According to the video recording apparatus and method, and the third program of the present invention, content protection information is detected from an input video signal, a thumbnail image signal corresponding to the video signal is generated, copy control information of the thumbnail image is generated based on the detected content protection information, and the video signal, the thumbnail image signal, and the copy control information are recorded into an information recording medium.

According to the video playback apparatus and method, and the fourth program of the present invention, a video signal, a thumbnail image signal corresponding to the video signal, and copy control information of the thumbnail image signal are played back from an information recording medium, and a copy control signal is added to the thumbnail image signal based on the played back copy control information, and then, the thumbnail image signal with the copy control signal is output.

BRIEF DESCRIPTION OF THE DRAWINGS

FIG. 10 illustrates the syntax of UIAppInfpoDVR
FIG. 11 illustrates the syntax of PlayListMark.
FIG. 12 illustrates the syntax of ClipMark.
FIG. 13 illustrates the syntax of a thumbnail information file.
FIG. 16 illustrates the syntax of tn_block.
FIG. 17 illustrates the syntax of CP_Info_thumbnail( ).
FIG. 18 illustrates CCI_thumbnail.
FIG. 19 illustrates APS_thumbnail.
FIG. 20 illustrates flag_need_AVstreamInfo.
FIG. 21 illustrates the syntax of another thumbnail information file.
FIG. 23 illustrates copy control processing.
FIG. 24 illustrates another copy control processing.

BEST MODE FOR CARRYING OUT THE INVENTION

Figure 1:
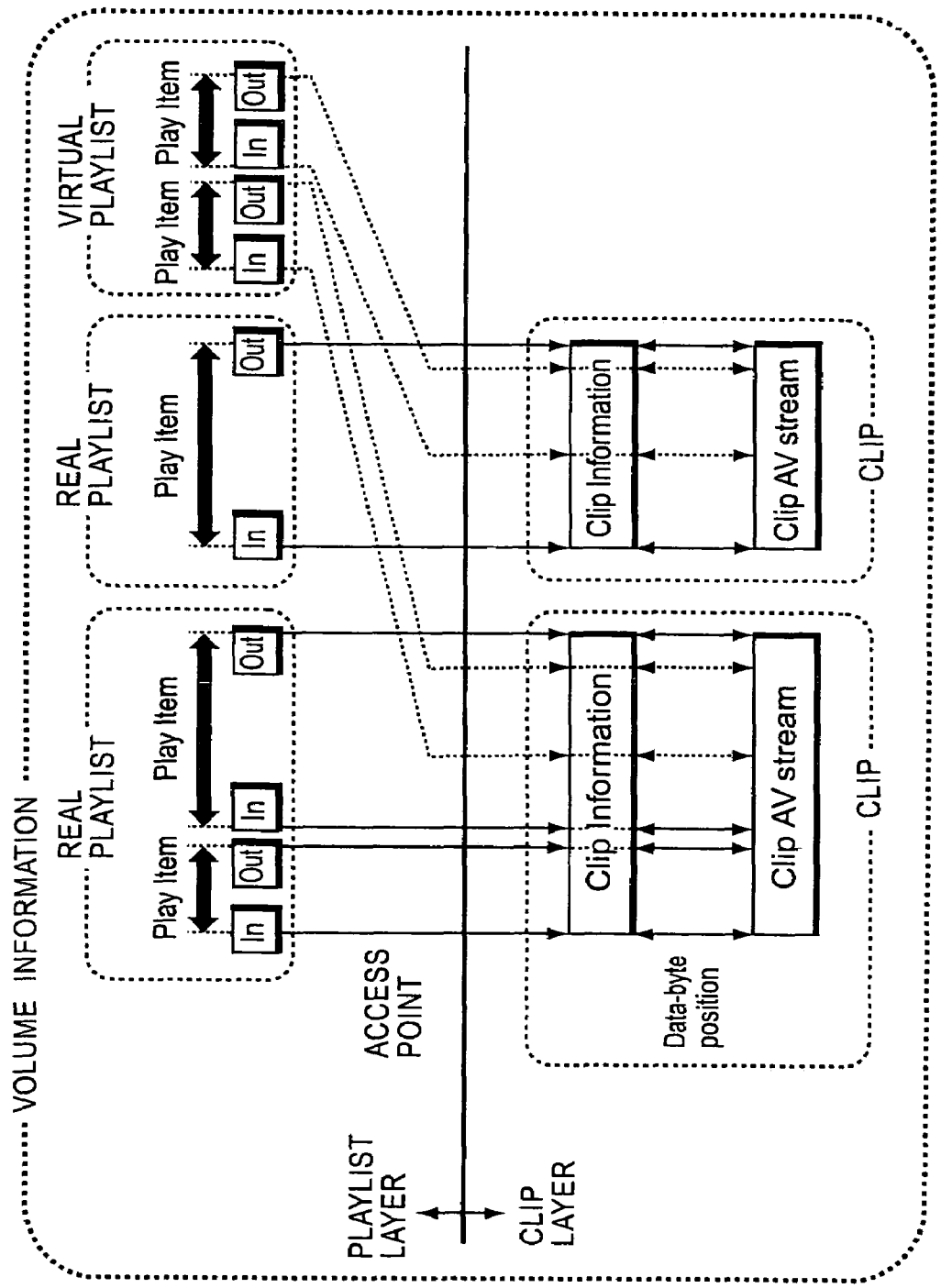
FIG. 1 illustrates the structure of an application format.

FIG. 1 illustrates a simplified structure of an application format on an information recording medium used in an information recording/playback system to which the present invention is applied. This format includes two layers, such as PlayList (play list) and Clip (clip), for managing AV (Audio Visual) streams. Volume Information manages all the items of Clip and PlayList in the disk.

A pair of one AV stream and additional information thereof is considered as one object, and is referred to as "Clip". An AV stream file is referred to as a "Clip AV stream file", and the additional information thereof is referred to as a "Clip Information file".

One Clip AV stream file stores data arranged in a structure in which an MPEG2 transport stream is defined by a DVR (Digital Video Recorder) application format.

Generally, a data file used in a computer is treated as a byte string. In contrast, the content of a Clip AV stream file is expanded on a time domain, and the PlayList designates the access point in the Clip mainly with a time stamp. When the PlayList designates the access point in the Clip with a time stamp, the Clip Information file serves to find information of the address in the Clip AV stream file at which the decoding of the stream should be started.

The PlayList has been introduced for allowing the user to select a desired playback zone from a Clip and to easily edit it. One PlayList consists of a set of playback zones in the Clip. One playback zone in a Clip is referred to as "PlayItem", and is represented by a pair of IN point and OUT point on the time domain. Accordingly, the PlayList consists of a set of PlayItems.

There are two types of PlayLists: one type is Real PlayList, and the other type is Virtual PlayList.

The Real PlayList is considered to share the stream of the Clip to which the Real PlayList refers. That is, the Real PlayList accounts for the data capacity in the disk corresponding to the stream of the Clip to which the Real PlayList refers. When an AV stream is recorded as a new Clip, the Real PlayList for referring to the range of the overall Clip that can be played back is automatically created. When part of the playback range of the Real PlayList is erased, the data of the corresponding stream of the Clip to which the Real PlayList refers is also erased.

The Virtual PlayList is not considered to share the data of the Clip. Even if the Virtual PlayList is changed or erased, the Clip does not change.

In the following description, the Real PlayList and the Virtual PlayList are simply referred to as the "PlayList".

Figure 2:
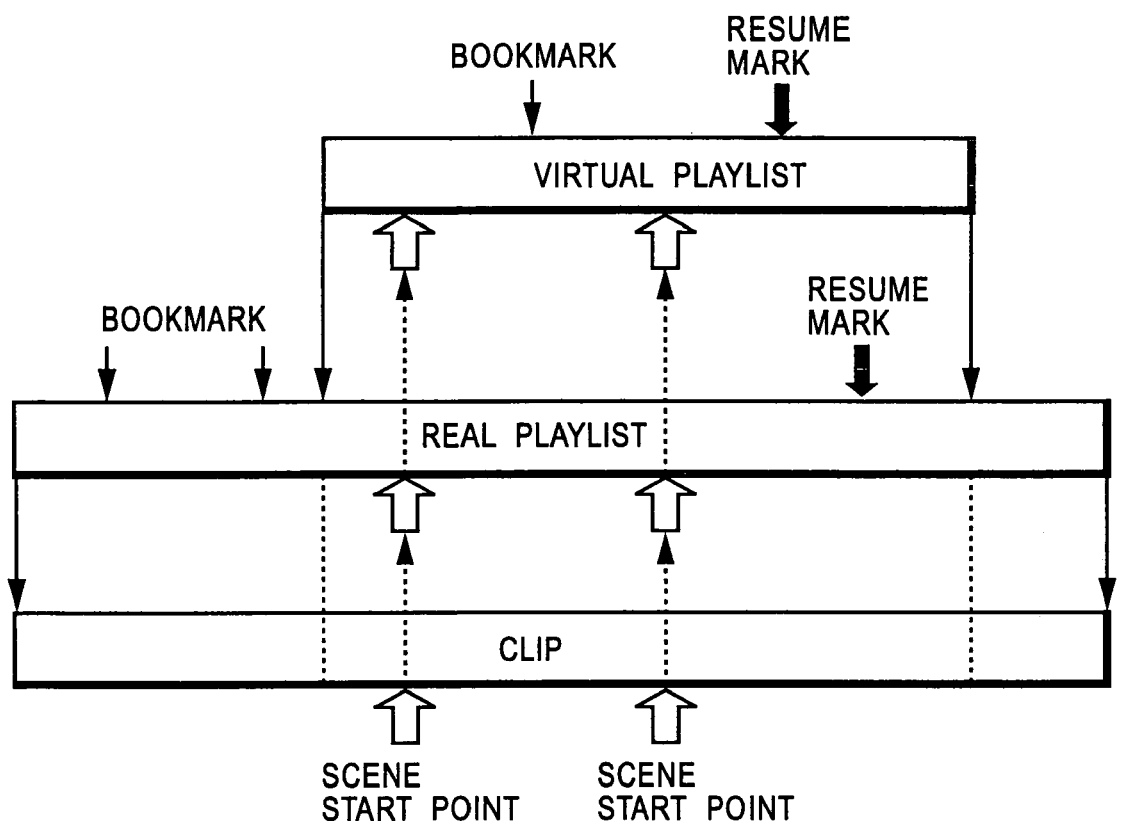
FIG. 2 illustrates marks on PlayList and marks on Clip.

FIG. 2 illustrates marks on the PlayList and marks on the Clip. Marks are used for designating highlights or characteristic time in the Clip or the PlayList.

(1) The marks added to the Clip designate characteristic scenes originating from the content of the AV stream. These marks consist of, for example, scene change points (scene start points). The PlayList can be played back by checking the marks of the Clip to which the PlayList refers.

(2) The marks added to the PlayList are mainly set by the user. These marks consist of, for example, bookmarks designated by the user with desired points or resume marks indicating the previous playback end points.

(3) Marks can be set in the Clip or the PlayList by adding a time stamp indicating the marking time to a mark list. Marks can be deleted by removing the corresponding time stamps of the marks from the mark list. Accordingly, the setting or the deleting of marks does not change the AV stream.

Figure 3:
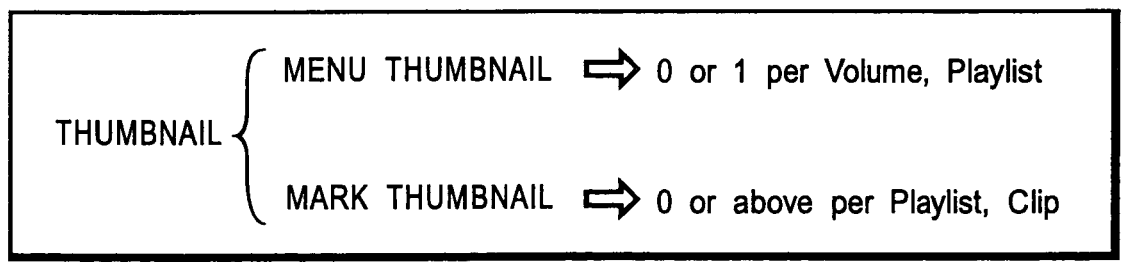
FIG. 3 illustrates a menu thumbnail and a mark thumbnail.

Thumbnails are still images to be added to the Volume (disk), the PlayList, or the Clip. There are two types of thumbnails as shown in FIG. 3. One type is a thumbnail serving as a typical image indicating the content (menu thumbnail), which is mainly used in a menu screen for allowing the user to select a desired image by operating the cursor. The other type is an image representing a scene designated by a mark (mark thumbnail).

Typical images can be provided for the Volume and the PlayList. The typical image of the Volume is used for initially displaying a still image indicating the content of the disk, which serves as an information recording medium, when the disk is inserted into a player (see Menu Thumbnail in FIG. 4). The typical image of the PlayList is used as a still image indicating the content of the PlayList on a menu screen for selecting the PlayList (see Menu Thumbnail in FIG. 5). The simplest implementation for the typical image of the PlayList is to use the first image of the PlayList as the thumbnail. However, the first image at the playback time 0 is not necessarily the optimal image for indicating the content. This is the reason for allowing the user to select a desired image as the thumbnail of the PlayList.

Figure 4:
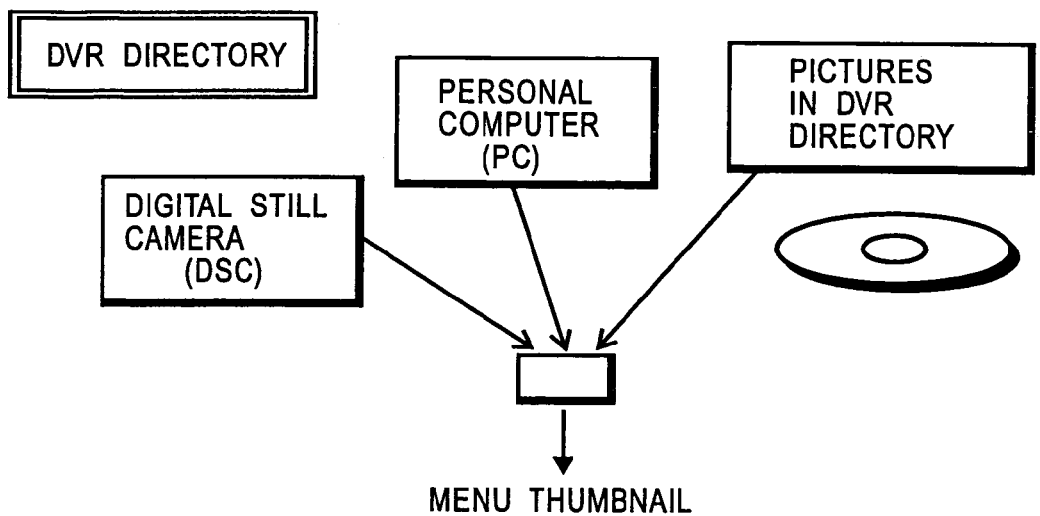
FIG. 4 illustrates a thumbnail representing the content of a disk.
Figure 5:
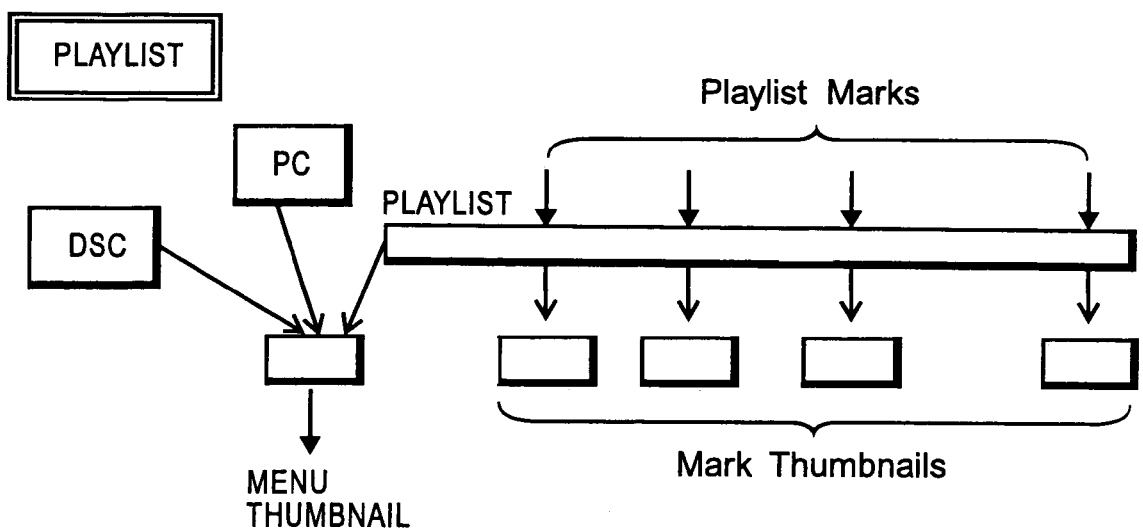
FIG. 5 illustrates marks added to PlayList.
Figure 6:
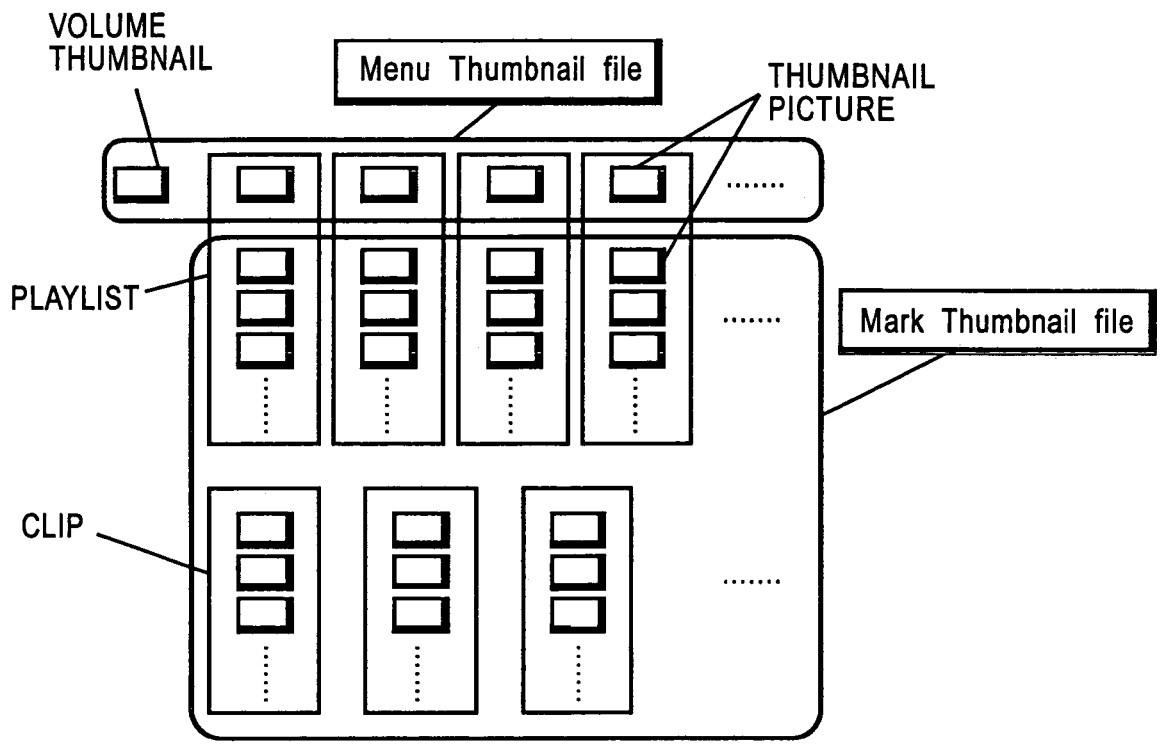
FIG. 6 illustrates a file in which thumbnail files are stored.

The above-described two types of thumbnails are referred to as "menu thumbnails". It is demanded that the menu thumbnails be read at high speeds from a disk since they are frequency displayed. To meet this requirement, all the menu thumbnails are efficiently stored in a single file (see Menu Thumbnail file in FIG. 6). The menu thumbnails are not restricted to pictures extracted from the moving pictures in the volume, and maybe images read from a personal computer (PC) or a digital still camera (DSC) (FIGS. 4 and 5).

Figure 7:
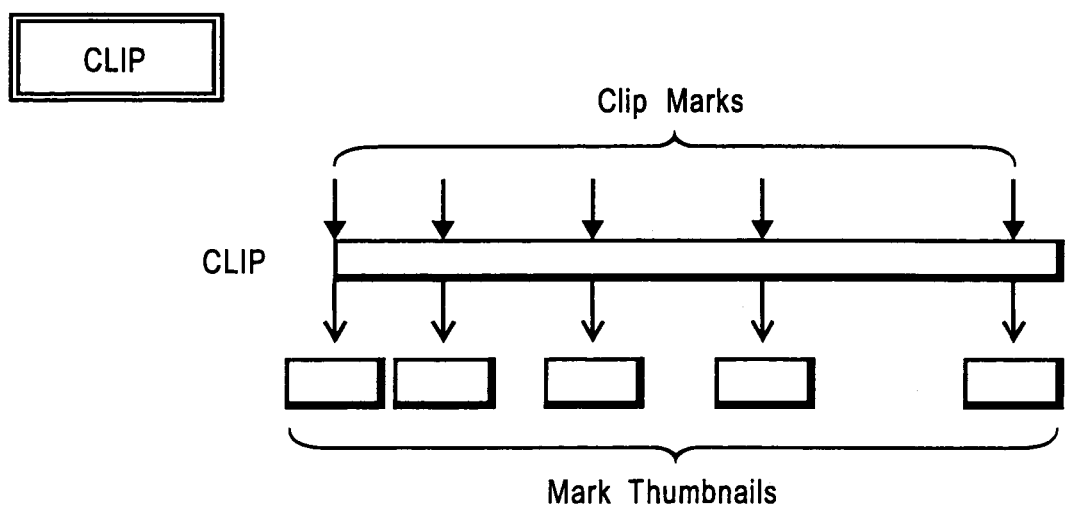
FIG. 7 illustrates marks added to Clip.

For the Clip and the PlayList, by adding a plurality of marks to certain positions, the content of the mark positions must be easily viewed from the images at the mark points. The pictures indicating the mark points are referred to as Mark Thumbnails (see Mark Thumbnails in FIGS. 5 and 7). In this case, although the source of the thumbnails can be images extracted from an external source, extracted images of mark points are mainly used. Unlike the menu thumbnails, a short access time is not demanded for the mark thumbnails since they are used in sub menus indicating details of the PlayList. Accordingly, there is no problem even if it takes time for the player to open the file and to read part of the file every time the thumbnail is required. For decreasing the number of files in the volume, all the mark thumbnails are preferably stored in a single file (mark thumbnails) so that the volume thumbnail and the menu thumbnail of the PlayList can be stored in a single menu thumbnail file (see Mark Thumbnail file in FIG. 6). The PlayList has a single menu thumbnail and a plurality of mark thumbnails. In contrast, the Clip does not have a menu thumbnail since the user does not have to directly select the Clip (usually, the user designates the Clip via the PlayList).

Figure 8:
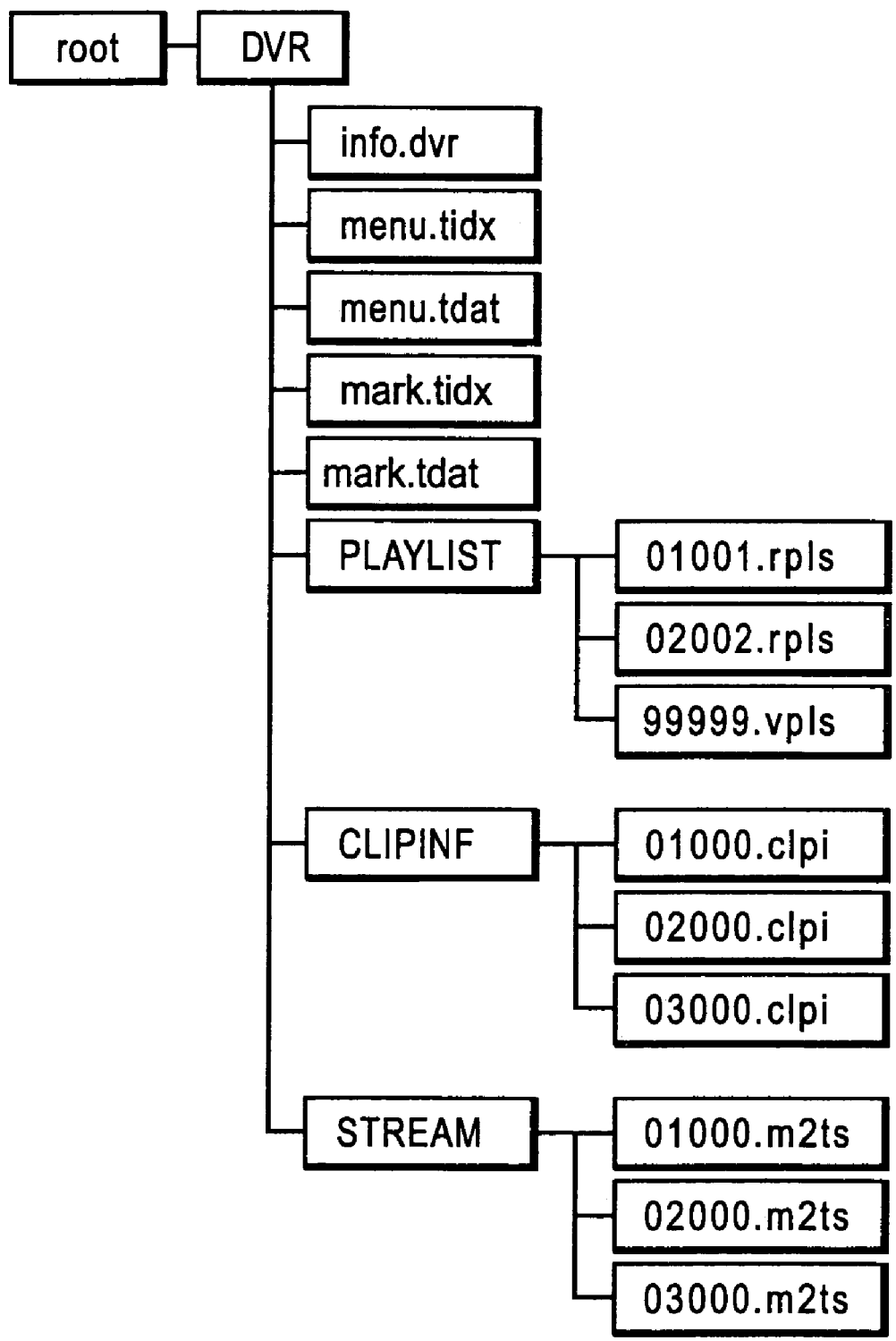
FIG. 8 illustrates the directory structure added to a disk.

The directories required on a DVR disk are as follows: a root directly, including a "DVR" directly; and DVR directories including a "PLAYLIST" directory, a "CLIPINF" directly, a "STREAM" directory, and a "DATA" directory. An example of the directory structure on the DVR disk is shown in FIG. 8.

The root directly includes one directory.

"DVR"—all the files and the directories defined by the DVR application format must be stored under this directory.

The "DVR" directory stores the following files.

"info.dvr"—this file stores overall information of the application layers created under the DVR directory. There must be only one info.dvr under the DVR directory. The file name is fixed as info.dvr.

"menu.tidx" and "menu.tdat"—these two files store information concerning the menu thumbnail images. The "menu.tidx" is a "thumbnail information file" storing header information of a menu thumbnail image, and the "menu.tdat" is a "thumbnail image file" storing image data of a menu thumbnail image.

"mark.tidx" and "mark.tdat"—these two files store information concerning mark thumbnail images. The "mark.tidx" is a "thumbnail information file" storing header information of a mark thumbnail image, and the "mark.tdat" is a "thumbnail image file" storing image data of a mark thumbnail image.

The "DVR" directory includes three directories.

"PLAYLIST"—Database files of the Real PlayList and the Virtual PlayList (FIG. 1) must be located under this directory.

"CLIPINF"—The database of the Clip (FIG. 1) must be located under this directory.

"STREAM"—The "AV stream file" (FIG. 1) must be located under this directory.

The "PLAYLIST" directory stores two types of PlayList files, which are a Real PlayList file and a Virtual PlayList file.

"xxxxx.rpls"—This file stores information concerning one Real PlayList. One file is created for each Real PlayList. The file name is "xxxxx.rpls", where "xxxxx" indicates five numbers from 0 to 9. The file extension must be "rpls".

"yyyyy.vpls"—This file stores information concerning one Virtual PlayList. One file is created for each Virtual PlayList. The file name is "yyyyy-vpls", where "yyyyy" indicate five numbers from 0 to 9. The file extension must be "vpls".

The "CLIPINF" directory stores one file corresponding to each AV stream file.

"zzzzz.clpi"—This file is a Clip Information File corresponding to one AV stream file (Clip AV stream file or Bridge-Clip AV stream file). The file name is "zzzzz.clpi" where "zzzzz" indicates five numbers from 0 to 9. The file extension must be "clpi".

The "STREAM" directory stores AV stream files.

"zzzzz.m2ts"—This file is an AV stream file handled by the DVR system. This is a Clip AV stream file or a Bridge-Clip AV stream file. The file name is "zzzzz.m2ts" where "zzzzz" indicates five numbers from 0 to 9. The file extension must be "m2ts".

A single AV stream file and the corresponding Clip information file must use the same five numbers "zzzzz".

Figure 9:
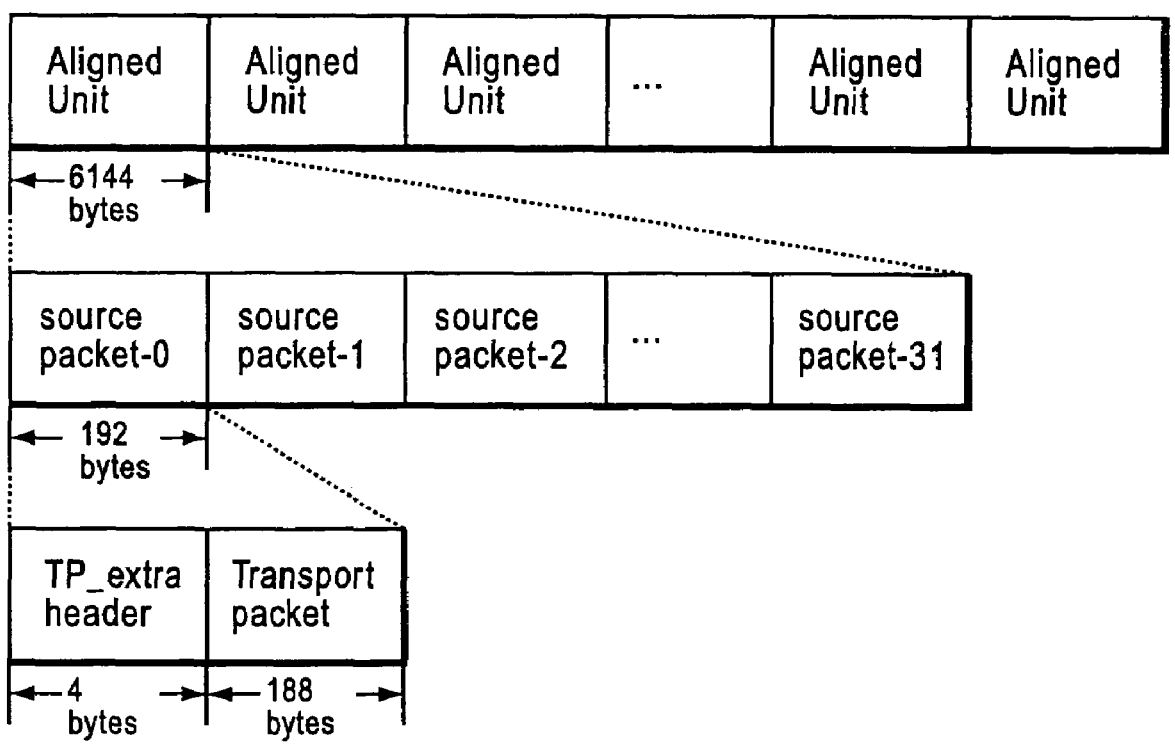
FIG. 9 illustrates the structure of a DVR MPEG2 transport stream.

The structure of the AV stream file is discussed below. The AV stream file must possess the structure of the DVR MPEG2 transport stream shown in FIG. 9. The DVR MPEG2 has the following features.

(1) The DVR MPEG2 transport stream consists of an integer number of Aligned units.

(2) The size of the Aligned unit is 6144 bytes (2048×3 bytes).

(3) The Aligned unit is started by the first byte of the source packet.

(4) The source packet has 192 bytes. One source packet consists of TP_extra_header and a transport packet. TP_extra_header has 4 bytes, and a transport packet has 188 bytes.

(5) One Aligned unit consists of 32 source packets.

(6) The final Aligned unit of the DVR MPEG2 transport stream also consists of 32 source packets.

(7) If the final Aligned unit is not completely filled with transport packets of an input transport stream, source packets having null packets (transport packets having PID=0x1FFF) must fill the remaining byte area.

The TP_extra_header contains copy restriction information of the payload of the transport packet and an arrival time stamp indicating the time at which the transport packet arrives at the decoder.

The database format for managing playback information of the AV stream file is described below.

FIG. 10 illustrates the syntax of UIAppInfpoDVR, which is part of the data to be stored in info-dvr. The ref_to_menu_thumbnail_index indicates the information of the thumbnail image representing the Volume. If the ref_to_menu_thumbnail_index field indicates a value other than 0xFFFF, a thumbnail image is added to the Volume, and is stored in the menu-tdat file. The image is referred to by using the value of thumbnail_index in the menu.tidx file (discussed in detail below with reference to FIG. 13). If the ref_to_menu_thumbnail_index field indicates 0xFFFF, a thumbnail image is not added to the Volume.

FIG. 11 illustrates the syntax of the PlayListMark, which is part of the data to be stored in the PlayList file. The PlayListMark stores the information of marks to be added to the PlayList. The typical image of the PlayList is also stored in the PlayListMark.

The number_of_Playlist_marks indicates the entry number of marks stored in the PlayListMark.

The mark_type designates the type of mark.

The ref_to_PlayItem_id indicates the value of PlayItem_id designating the PlayItem added with a mark.

The mark_time_stamp stores a time stamp indicating the point at which the mark is designated.

The ref_to_menu_thumbnail index indicates the information of the thumbnail image, which is a typical image of the PlayList. If the ref_to_menu_thumbnail_index field indicates a value other than 0xFFFF, there is a thumbnail image representing a typical image of the PlayList, and the thumbnail image is stored in the menu.tdat file. The image is referred to by using the value of the thumbnail_index in the menu.tidx file (discussed in detail below with reference to FIG. 13). If the ref_to_menu_thumbnail_index field is 0xFFFF, there is no thumbnail image representing a typical image of the PlayList.

The ref_to_mark_thumbnail_index indicates the information of the thumbnail image to be added to a mark. If the ref_to_mark_thumbnail_index field indicates a value other than 0xFFFF, a thumbnail image is added to the mark, and is stored in the mark.tdat file. The image is referred to by using the value of the thumbnail_index in the mark.tidx file (discussed in detail below with reference to FIG. 13). If the ref_to_mark_thumbnail_index field indicates 0xFFFF, a thumbnail image is not added to the mark.

FIG. 12 illustrates the syntax of the ClipMark, which is part of the data to be stored in the Clip Information file. The ClipMark stores the information of a mark to be added to the Clip.

The number_of_Clip_marks indicates the entry number of marks stored in the ClipMark.

The mark_type indicates the type of mark.

The ref_to_STC_id is information designating the time domain of the system time base of the Clip in which mark_time_stamp is placed.

The mark_time_stamp represents the point at which a mark is designated in the Clip AV stream by using a presentation time stamp as a base.

The ref_to_mark_thumbnail_index indicates information of a thumbnail image to be added to a mark. If the ref_to_mark_thumbnail_index filed is a value other than 0xFFFF, a thumbnail image is added to the mark, and is stored in the mark.tdat file. The image is referred to by using the value of the thumbnail_index in the mark.tidx file (discussed below with reference to FIG. 13). If the ref_to_mark_thumbnail_index field indicates 0xFFFF, a thumbnail image is not added to the mark.

The content of a file storing the information of thumbnails is described below.

The "menu.tidx" and "menu.tdat" (FIG. 8) store information of a menu thumbnail, i.e.; one picture representing the Volume, and information of one picture representing each PlayList, respectively. The header information of all the menu thumbnails is managed by a single menu-tidx. The picture data of all the menu thumbnails is collected and managed by a single menu.tdat.

The "mark.tidx" and "mark.tdat" (FIG. 8) store information concerning pictures designated by mark thumbnails, i.e., mark points. The header information of all the mark thumbnails added to all the items of Clip and PlayList in the Volume is collected and managed by a single mark-tidx. The picture data of all the mark thumbnails is collected and managed by a single mark-tdat.

The picture data of thumbnails is, for example, data encoded by JPEG.

The syntax and semantics of these four files are as follows.

The "menu.tidx" and "mark.tidx" have the same syntax structure. FIG. 13 illustrates the syntax structure of the "menu.tidx" and "mark.tidx".

The number_of_thumbnails indicates the number of thumbnail pictures stored in the menu.tdat in the case of the menu-tidx, or indicates the number of thumbnail pictures stored in the mark.tdat in the case of the mark.tidx.

The tn_block_size indicates the size of one tn_block in the menu.tdat in the case of the menu.tidx, and indicates the size of one tn_block in the mark.tdat in the case of the mark-tidx. The unit of this size is 1024 bytes. For example, if tn_block_size=16, the size of one tn_block is 16×1024 bytes. One thumbnail picture must be stored in a single tn_block.

The number_of_tn_blocks indicates the number of tn_blocks in the menu-tdat in the case of the menu.tidx, and indicates the number of tn_blocks in the mark.tdat in the case of the mark.tidx.

The thumbnail_index indicates the index number of the thumbnail information subsequent to the thumbnail_index field. As the thumbnail_index, 0xFFFF cannot be used. In the case of the menu.tidx, the thumbnail_index can be referred to by the ref_to_menu_thumbnail_index in the UIAppInfoVolume( ) and PlayListMark( ). In the case of the mark.tidx, the thumbnail_index can be referred to by the ref_to_mark_thumbnail_index in the PlayListMark( ) and ClipMark ( ).

The ref_to_tn_block_id refers to the value of the tn_block_id in the syntax of the menu.tdat/mark.tdat. In the case of the menu.tidx, the ref_to_tn_block_id indicates one tn_block in the menu.tdat, and the tn_block stores a thumbnail image designated by the thumbnail_index. In the case of the mark.tidx, the ref_to_tn_block_id indicates one tn_block in the mark.tdat, and the tn_block stores a thumbnail image designated by the thumbnail_index.

The picture_byte_size [ref_to_tn_block_id] indicates the data length of a thumbnail image having the index number of thumbnail_index as the byte unit. The picture_byte_size has to be (1024xtn_block_size-N1) bytes or smaller (N1 is discussed below with reference to FIG. 16). That is, a recording apparatus must encode data so that the data length of an encoded thumbnail picture becomes (1024xtn_block_size-N1) byte or smaller.

The horizontal_picture_size[ref_to_tn_block_id] indicates the number of horizontal pixels of a thumbnail having the index number of thumbnail_index.

The vertical picture_size[ref_to_tn_block-id] indicates the number of vertical pixels of a thumbnail image having the index number of thumbnail_index.

Figures 14, 15:
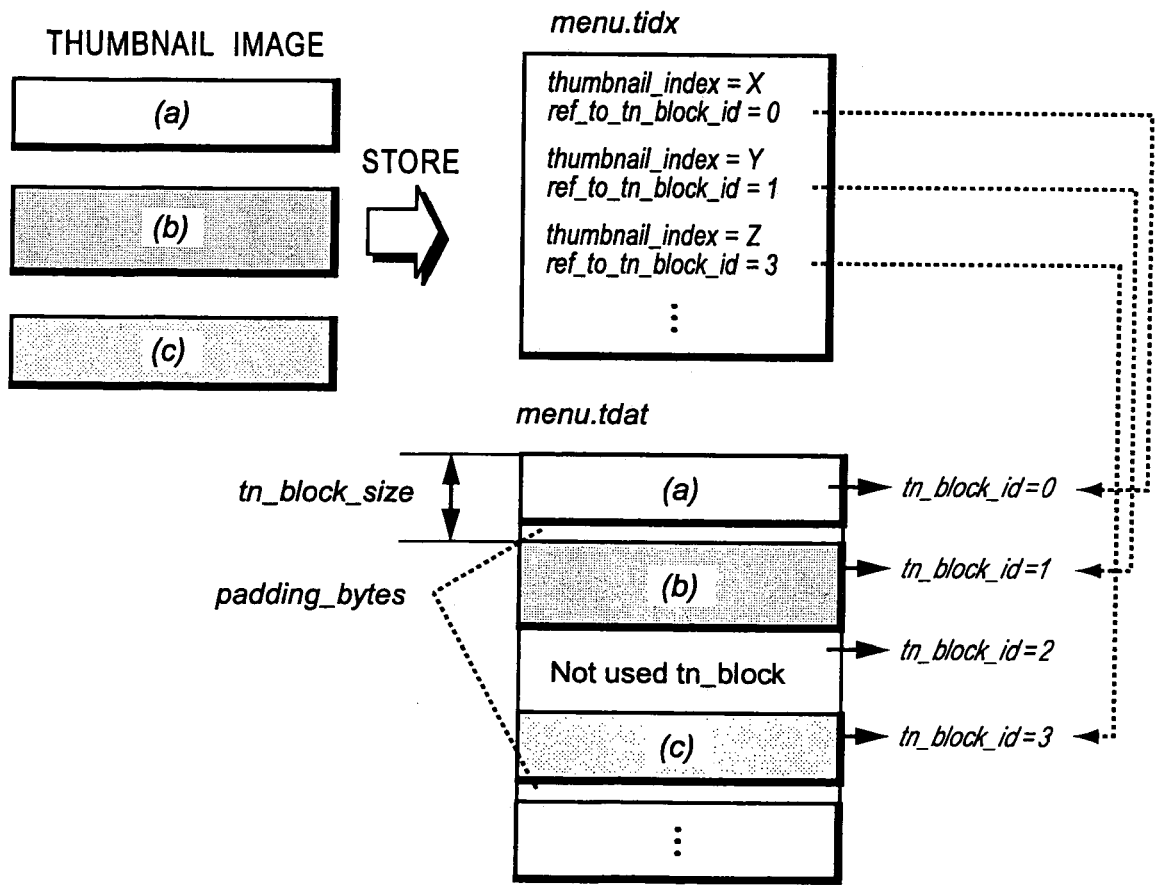
FIG. 14 illustrates the syntax of a thumbnail image file.
FIG. 15 illustrates a method for storing thumbnail image data in tn_block( ).

FIG. 14 illustrates the syntax structure of the "menu.tdat" and "mark.tdat". The "menu.tdat" and "mark.tdat" have the same syntax structure.

The tn_block(tn_block_id) indicates one tn_block designated by one argument of the tn_block_id in the array of the tn_block. In the case of the menu.tdat, the value of the tn_block_id is referred to by the ref_to_tn_block_id in the menu.tidx. In the case of the mark.tdat, the value of the tn_block_id is referred to by the ref_to_tn_block_id in the mark.tidx.

In the case of the menu.tdat, the size of one tn_block is indicated by the tn_block_size in the menu.tdat. In the case of the mark.tdat, the size of one tn_block is indicated by the tn_block_size in the mark.tdat.

FIG. 15 illustrates an example of usage methods of tn_block. Since thumbnails are frequency added or deleted, the addition and the partial deletion must be performed easily and fast. For this reason, the menu.tdat and the mark.tdat have a block structure. One thumbnail image is stored in one tn_block. In the example, shown in FIG. 15, thumbnail images a, b, c are stored in tn_blocks having tn_block_id=0, 1, 3, respectively.

There may be an unused tn_block (in the example of FIG. 15, tn_block having tn_block_id=2) in the tn_block string of the menu.tdat and the mark.tdat. For example, for deleting a thumbnail, when the thumbnail_index entered in a thumbnail information file is erased without changing the thumbnail image file, an unused tn_block is created in the tn_block string.

FIG. 16 illustrates the syntax of the tn_block (tn_block_id).

The thumbnail_picture[tn_block_id] is an area in which one thumbnail image designated by the value of the tn_block id is stored.

In the case of the menu.tdat, the value of the tn_block id is referred to by the ref_to_tn_block_id in the menu.tidx. In the case of the mark.tdat, the value of the tn_block_id is referred to by the ref_to_tn_block_id in the mark.tidx.

The first byte of the thumbnail picture must coincide with the first byte of the thumbnail_picture[tn_block_id]. The encoding byte size of the thumbnail picture is equal to the picture_byte_size[tn_block_id].

The CP_Info_thumbnail( ) is N1-byte information indicating the content protection information of the thumbnail image to be stored in the thumbnail_picture[tn_block_id]. The content protection information is described below while referring to the processing of the recording apparatus shown in FIG. 22.

The padding_byte is a one-byte value. NP is calculated to satisfy the following equation:

$$NP = tn\_block\_size \times 1024 - picture\_byte\_size[tn\_block\_id] - N1.$$

FIG. 17 illustrates the syntax of the CP_Info_thumbnail ( ).

The CCI_thumbnail indicates the copy generation management information of the thumbnail image. The meanings of the values are shown in FIG. 18.

"00" is copy free; "01" is no more copy; "10" is copy once; and "11" is copy prohibited.

The APS_thumbnail indicates the analog copy protection information when a thumbnail image is output as analog video. The meanings of the values are shown in FIG. 19. The definition of the APS "00" through "11" is disclosed in Default Settings of the Macrovision Antitaping Process for DVD Products, Revision 1.0, Jul. 5, 1997. The 2L/4L Colorstrip is applicable only for NTSC analog output.

The flag_need_AVstreamInfo indicates whether it is necessary to refer to the content protection information in the Clip AV stream as the content protection information of a thumbnail image created from an image in the Clip AV stream. The meanings of the values are shown in FIG. 20. "1" indicates "necessary", and "0" indicates "unnecessary".

Specific examples of the content protection information other than CCI_thumbnail and APS_thumbnail may include information to be added to the DTCP_descriptor by the DTLA in the future. As of July in 2001, the DTCP_descriptor has only the information of CCI and APS. In the future, however, when the DTLA introduces new content protection information to video signals, it may be necessary for the DTLA to apply the new content protection information to thumbnail images created by using images contained in the video signals. In this case, the flag_need_AVstreamInfo is set to 1. When the value is 1, it is necessary to refer to the content protection information (DTCP descriptor, etc.) for the image in the Clip AV stream designated by the mark_time_stamp of the mark related to the thumbnail image as the content protection information of the thumbnail image.

The content protection information other than the CCI and the APS include information concerning resolution restrictions when video content is played back in analog format, and information concerning the period for which video content can be copied.

The Integrity_Check_Value is code for indicating that the content of the CP_Info_thumbnail( ) is not tampered with. This is calculated by a specific encryption algorithm by using the first byte of the CP_Info_thumbnail( ) to the byte immediately before the Integrity_Check_Value as an input.

The encryption algorithm may use the algorithm described in, for example, ISO/IEC9797 (Information technology—Security techniques—Data integrity mechanism using a cryptographic check function employing a block cipher algorithm).

Even if the content of the CP_Info_thumbnail( ) is tampered with by a dishonest user, the recording apparatus is able to detect that the CP_Info_thumbnail( ) has been tampered with by checking the value of the Interity_Check_Value. If the recording apparatus detects that the CP_Info_thumbnail( ) has been tampered with, it prohibits the thumbnail having the CP_Info_thumbnail( ) from being played back since the CP_Info_thumbnail( ) is no longer valid. Alternatively, the recording apparatus may scramble the overall menu.tdat file and mark.tdat file so as to prevent the content of the CP_Info_thumbnail( ) from being tampered with.

In the syntax of the tn_block( ), as shown in FIG. 15, the CP_Info_thumbnail( ) is placed after the thumbnail_picture [tn_block_id]. The reason for this is as follows. Because of this format, the start position of the CP_Info_thumbnail( ) can be randomized in the thumbnail image file (menu.tdat/mark.tdat). If the CP_Info_thumbnail( ) is placed before the thumbnail_picture[tn_block_id], the CP_Info_thumbnail( ) regularly appears in the thumbnail image file in the units of tn_block_size. If the CP_Info_thumbnail( ) is placed after the thumbnail_picture[tn_block_id], the start position of the CP_Info_thumbnail( ) can be randomized since the size of the thumbnail_picture[tn_block_id] is variable by the size of the thumbnail image. This makes it effectively difficult to extract the content of the CP_Info_thumbnail( ) from the thumbnail image file.

The CP_Info_thumbnail( ) may be stored in the menu.tidx/mark.tidx file, as shown in FIG. 21.

Figure 22:
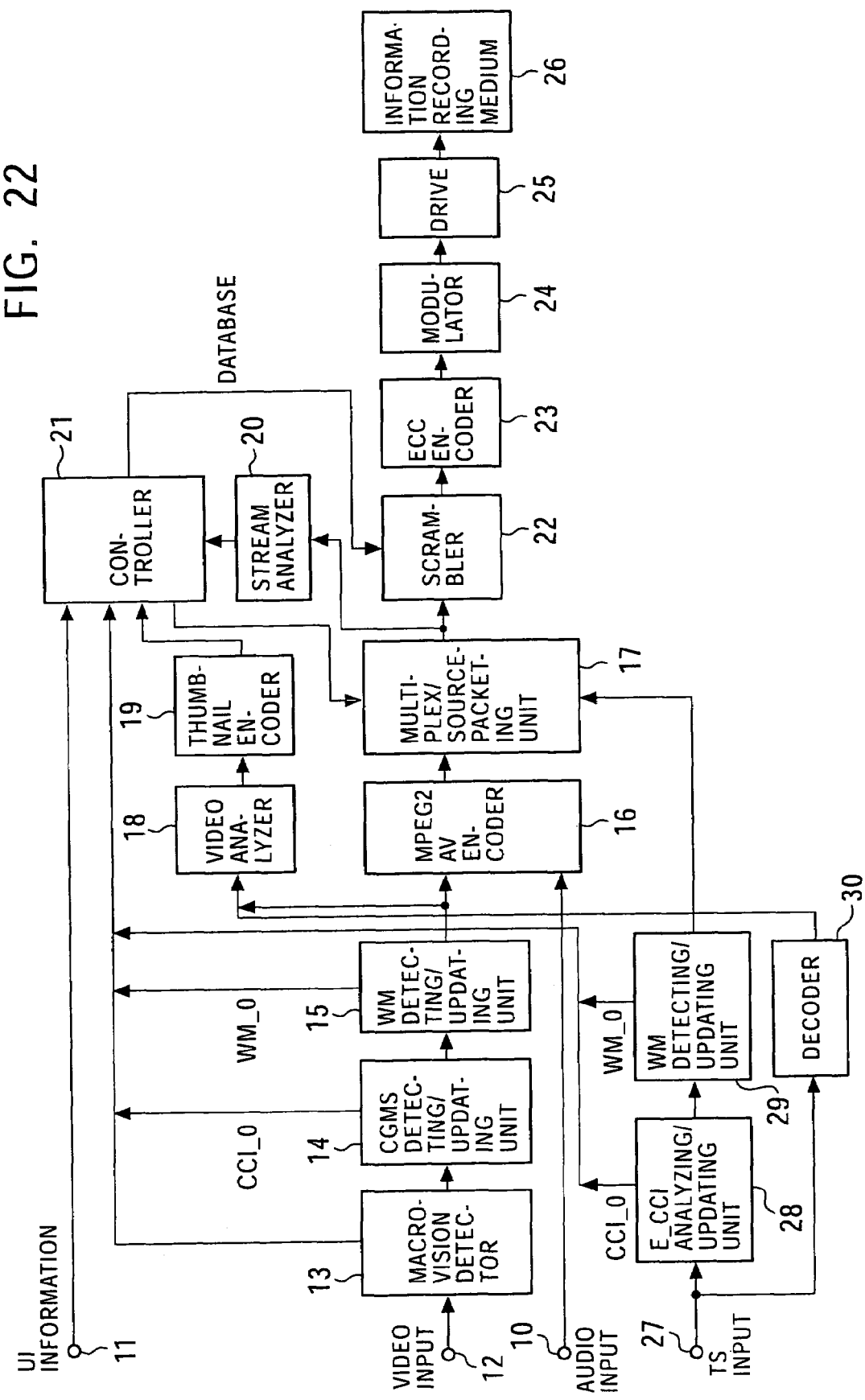
FIG. 22 is a block diagram illustrating the configuration of a recording apparatus.

FIG. 22 is a block diagram illustrating a recording apparatus for recording AV streams and also for encoding typical images or images at mark points of the AV streams into thumbnails and recording them.

A description is first given of the recording of an AV stream obtained by self-encoding a video input and an audio input from terminals 12 and 10, respectively. A Macrovision (trade name) detector 13 detects an analog copy protection signal (APS) of the input video according to a predetermined method, and imposes recording restrictions on video signals. Only when the input video signal does not contain APS, can it be recorded. Accordingly, when the video signal can be recorded, the APS indicates copy free (00).

When the input video signal does not contain APS, the macrovision detector 13 supplies the input video into a CGMS detecting/updating unit 14. The CGMS detecting/updating unit 14 analyzes the CGMS (CGMS-A or CGMS-D) of the input video according to a predetermined method, and supplies the CCI (CCI$_o$ in FIG. 22) of the AV stream to be recorded to a controller 21. The CGMS detecting/updating unit 14 supplies the input video to a WM (WaterMark) detecting/updating unit 15.

The WM detecting/updating unit 15 detects and analyzes the WaterMark in the input video according to a predetermined method, and supplies the WM (indicated by WM$_o$ in FIG. 22) of the AV stream to be recorded to the controller 21. The WM detecting/updating unit 15 supplies the input video to an MPEG2 AV encoder 16 and a video analyzer 18.

The MPEG2 AV encoder 16 encodes the input video signal and the input audio signal, and supplies a video stream and an audio stream to a multiplex/source-packeting unit 17.

The controller 21 determines the value of E-CCI (Embedded CCI) to be encoded in a multiplex stream in the multiplex/source-packeting unit 17 based on the CCI$_o$ and the WM$_o$ input into the controller 21. The multiplex/source-packeting unit 17 multiplexes the video stream with the audio stream, and supplies the AV stream to a scrambler (encryption unit) 22 and a stream analyzer 20.

The scrambler (encryption unit) 22 encrypts the input AV stream according to a predetermined method, and supplies it to an ECC encoder 23. The AV stream undergoes processing in the ECC encoder 23, a modulator 24, and a drive 25, and is then recorded in an information recording medium 26 as an AV stream file.

The recording apparatus of this embodiment records an AV stream file and also records application database information (info.dvr, PlayList, Clip Information, a thumbnail information file, and a thumbnail image file) associated with this file. The application database information is generated by the controller 21. The information input into the controller 21 includes characteristic information of the video signal from the video analyzer 18, characteristic information of the AV stream from the stream analyzer 20, and user instruction information input from the terminal 11.

The characteristic information of the video signal from the video analyzer 18 is automatically generated by the recording apparatus. The video analyzer 18 analyzes the content of the input video signal so as to generate information concerning the images at characteristic mark points in the input video signal. Such information includes, for example, designation information concerning the images at the mark points, such as the program start point, the scene change points, the CM start/end points of the input video signal. The image at the first mark point of the input video signal may be used as a typical image (typical image of PlayList) of the video signal.

The video analyzer 18 inputs time stamps (mark positions) indicating the mark-point images of the video signal into the controller 21. A thumbnail encoder 19 encodes the images at the mark points into thumbnail images, and supplies them to the controller 21. The controller 21 stores the time stamps of the mark points, CCI$_o$ and WM$_o$ corresponding to the mark-point images, and the thumbnail images of the mark-point images so that they are related to each other. The controller 21 also determines the value of the CCI_thumbnail of the above-described CP_Info_thumbnail( ) based on the CCI$_o$ and WM$_o$ associated with the mark-point images.

The stream analyzer 20 detects the content protection information (DTCP descriptor, etc.) for the images in the AV stream designated by the time stamps of the mark points. The stream analyzer 20 then determines whether the content protection information (DTCP_descriptor, etc.) contains information other than the CCI and APS. If the content protection information contains information other than the CCI and APS, the stream analyzer 20 sets 1 in the flag_need_AvstreamInfo of the CP_Info_thumbnail( ) (FIG. 17) corresponding to the thumbnail image at the mark point. If there is no information other than the CCI and APS in the content protection information, the stream analyzer 20 sets 0 in the flag_need_AvstreamInfo.

The copy control processing when an AV stream obtained by self-encoding an input video signal is shown in FIG. 23.

When the CGMS or the WM of the input signal indicates "01" or "101" (no more copy), respectively, or indicates "11" (copy prohibited), the recording of the input video signal is not allowed. If the CGMS or the WM indicates "10" (copy once), the input video signal is recorded, and the CGMS or the WM is overwritten by "01" or "101" (no more copy). If the CGMS or the WM of the input video signal indicates "00" (copy free), the input video signal is recorded, and the CGMS or the WM remains as the same value ("00" (copy free)).

The controller 21 generates information concerning thumbnails to be stored in the application database information (info.dvr, PlayList file, Clip Information file, a thumbnail information file, and a thumbnail image file). The controller 21 supplies the application database information to the scrambler 22. The scrambler 22 encrypts the input application database information according to a predetermined method, and supplies the encrypted information to the ECC encoder 23. The application database information undergoes processing in the ECC encoder 23, the modulator 24, and the drive 25, and is then recorded in the information recording medium 26 as an application database file.

The recording of a transport stream (TS) input from a terminal 27 is now described. An E_CCI (Embedded CCI) analyzing/updating unit 28 analyzes the E_CCI (Embedded CCI) encoded in the input TS according to a predetermined method, and supplies the CCI (indicated by $CCI_{\_o}$ in FIG. 22) of the AV stream to be recorded to the controller 21. The E_CCI analyzing\updating unit 28 also supplies the input TS to a WM detecting/updating unit 29.

The WM detecting/updating unit 29 analyzes the WaterMark of the input video, and supplies the WM (indicated by $WM_{\_o}$ in FIG. 22) of the AV stream to be recorded to the controller 21. The WM detecting/updating unit 29 supplies the input TS to the multiplex/source-packeting unit 17. The multiplex/source-packeting unit 17 converts the input TS into a source packet stream, and supplies it to the stream analyzer 20 and the scrambler 22.

The scrambler (encryption unit) 22 scrambles (encrypts) the input AV stream according to a predetermined method, and supplies it to the ECC encoder 23. The AV stream undergoes processing in the ECC encoder 23, the modulator 24, and the drive 25, and is then recorded in the information recording medium 26 as an AV stream file.

A TS input from the terminal 27 is input into a decoder 30. The decoder 30 decodes a video stream of the input TS, and supplies the video signal to the video analyzer 18. The processing of the video analyzer 18 and the thumbnail encoder 19 is similar to the above-described self-encoding processing for the input video from the terminal 12.

The stream analyzer 20 analyzes the content protection information (DTCP_descriptor, etc.) in the input stream, extracts the analog copy protection information (APS), and supplies it to the controller 21. The APS for the images at the mark points of the input stream is set to be the same value as the APS_thumbnail of the thumbnail images of the mark-point images.

The values of the CCI_thumbnail and the flag_need_AvstreamInfo are determined by the stream analyzer 20 in a manner similar to those when the above-described input video is recorded by self-encoding it.

The copy control processing when the input TS is recorded is shown in FIG. 24. The content of the copy control processing is substantially similar to that shown in FIG. 23.

The controller 21 supplies the application database information to the scrambler 22. The scrambler 22 encrypts the input application database information according to a predetermined method, and supplies the encrypted information to the ECC encoder 23. The application database information undergoes processing in the ECC encoder 23, the modulator 24, and the drive 25, and is then recorded in the information recording medium 26 as an application database file.

Figure 25:
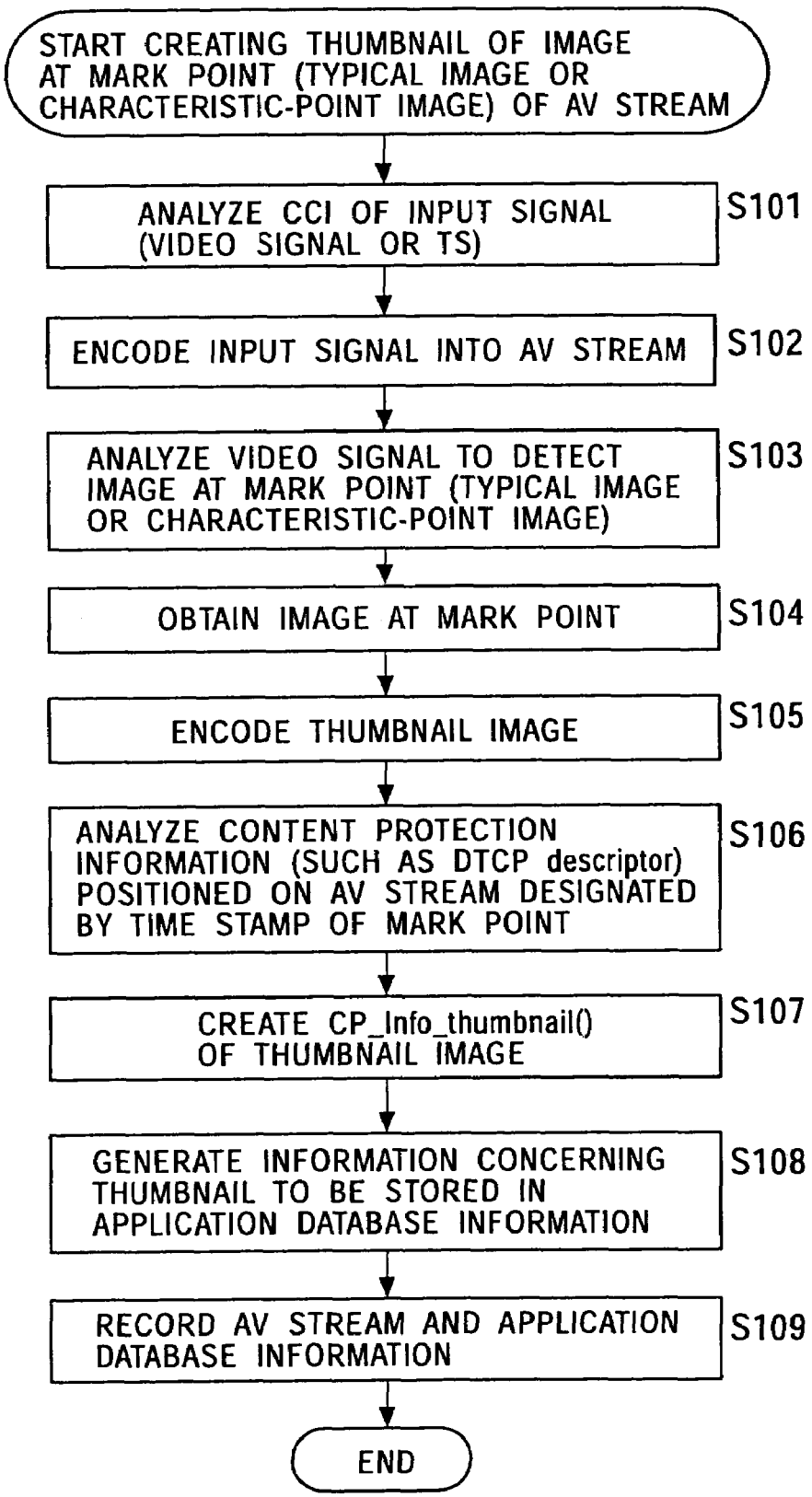
FIG. 25 is a flowchart illustrating processing for creating a thumbnail of an image at a mark point of an AV stream.

The flowchart illustrating the processing for recording an AV stream and also for encoding a typical image and characteristic-point images into thumbnails and recording them is shown in FIG. 25.

In step S101, the Macrovision detector 13, the CGMS detecting/updating unit 14, the WM detecting/updating unit 15, the E_CCI analyzing/updating unit 28, and the WM detecting/updating unit 29 analyze the CCI of the input signal (video signal or TS).

In step S102, the MPEG2AV encoder 16 and the multiplex-stream/source-packeting unit 17 encode the input signal into 20 an AV stream.

In step S103, the, video analyzer 18 analyzes the video signal to detect images at mark points (typical image and the characteristic-point images).

In step 5104, the controller 21 obtains the images at the mark points.

In step S105, the thumbnail encoder 19 encodes the images at the mark points into thumbnail images.

In step S106, the controller 21 analyzes the content protection information (DTCP descriptor, etc.) positioned on the AV stream designated by the time stamps of the mark points.

In step S107, the controller 21 creates CP_Info_thumbnail( ) of a thumbnail image. More specifically, as stated above, the controller 21 determines the values of the CCI_thumbnail and the APS_thumbnail, the flag_need_AvstreamInfo.

In step S108, the controller 21 generates information concerning the thumbnails to be stored in the application database information.

In step S109, the scrambler 22, the ECC encoder 23, the modulator 24, and the drive 25 record the AV stream and the application database information into the information recording medium 26.

Figure 26:
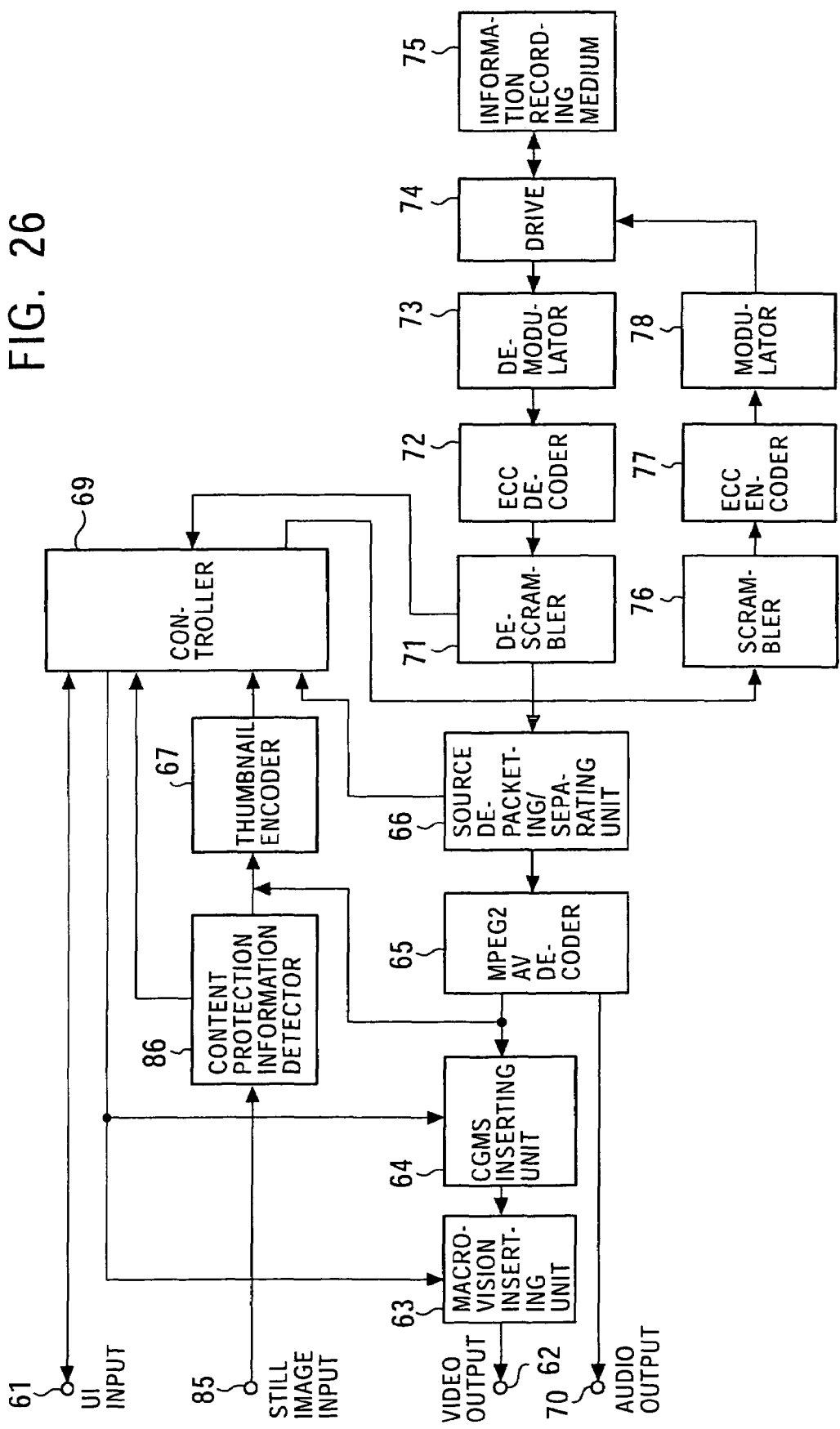
FIG. 26 is a block diagram illustrating another example of the configuration of the recording apparatus.

FIG. 26 is a block diagram illustrating a recording apparatus for adding a thumbnail of an image designated by the user to a recorded AV stream and for recording the thumbnail.

An application database. read from an information recording medium 75 via a drive 74 undergoes processing in a demodulator 73, an ECC decoder 72, and a descrambler 71, and is then input into a controller 69. The controller 69 creates a menu screen indicating the recorded content of the information recording medium 75, and outputs it to a monitor (not shown) and displays it. The user selects a PlayList to be played back via UI input from a terminal 61. The controller 69 gives an instruction to read the AV stream required for playing back the PlayList designated by the user from the information recording medium 75.

An AV stream file read from the information recording medium 75 via the drive 74 undergoes processing in the demodulator 73, the ECC decoder 72, and the descrambler 71, and is then input into a source-depacketing/separating unit 66. The video stream separated by the source-depacketing/separating unit 66 is decoded in an MPEG2AV decoder 65 so as to output a video signal. The video signal undergoes predetermined processing in a CGMS inserting unit 64 and a Macrovision inserting unit 63, and is output from a terminal 62. The video signal is then output to a monitor and is displayed. An audio signal is output to a speaker (not shown) from a terminal 70.

The user selects scenes (for example, favorite scenes) to be marked from the video to be played back, and indicates the scenes to the controller 69 via the UI input from the terminal 61.

Thumbnail images to be recorded by being added to the mark points may be created from the mark-point images or from the images recorded from a personal computer or a digital still camera into the recording apparatus via an external input.

When a thumbnail image is created from an image at a mark point, the controller 69 obtains the time stamp of the image marked by the user. The controller 69 then obtains the image at the mark point from the MPEG2 AV decoder 65, and inputs the image into a thumbnail encoder 67. The thumbnail encoder 67 encodes the thumbnail image and inputs it into the controller 69. The source-depacketing/separating unit 66 extracts the content protection information (DTCP descriptor, etc.) positioned on the AV stream designated by the time stamp of the mark point, and inputs it to the controller 69.

The controller 69 analyzes the content protection information (DTCP_descriptor, etc.) and extracts the CCI and the analog copy protection information (APS). The controller 69 then sets the values of the CCI_thumbnail and the APS_thumbnail of the CP_Info_thumbnail( ) for the thumbnail image of the mark-point image to be the same values of the CCI and the APS, respectively. The controller 69 also makes analysis to determine whether there is any content protection information other than the above-described CCI and APS. If there is content protection information other than the CCI and the APS, the controller 69 sets 1 in the flag_need_AvstreamInfo of the CP_Info_thumbnail( ) corresponding to the thumbnail image at the mark point. If there is no content protection information other than the CCI and the APS, the controller 69 sets 0 in the flag_need_AvstreamInfo.

A description is now given of the operation for creating a thumbnail image, which is to be recorded by being added to a mark point, from a still image read into the recording apparatus via an external input, such as a personal computer or a digital still camera. The controller 69 obtains a still image from an external input terminal 85. A content protection information detector 86 extracts the content protection information (such as CGMS, APS, and DTCP descriptor) of the input image, and inputs it into the controller 69. The controller 69 analyzes the content protection information, and extracts the CCI and the analog copy protection information (APS). The controller 69 then sets the values of the CCI_thumbnail and the APS-thumbnail of the CP_Info_thumbnail( ) for the thumbnail image to be the same values of the above-described CCI and APS, respectively. The controller 69 sets the flag_need_AvstreamInfo to be zero. The still image is then input into the thumbnail encoder 67. The thumbnail encoder 67 encodes the thumbnail image, and inputs it into the controller 69.

After generating the thumbnail image and the content protection information thereof, the controller 69 generates information concerning the thumbnail to be stored in the application database information (info.dvr, PlayList file, Clip Information file, the thumbnail information file, and the thumbnail image file). The controller 69 supplies the application database information to a scrambler 76. The scrambler 76 scrambles (encrypts) the input application database information according to a predetermined method, and supplies the scrambled information to an ECC encoder 77. The application database information undergoes processing in the ECC encoder 77, the modulator 78, and the drive 74, and is then recorded into the information recording medium 75 as an application database file.

Figure 27:
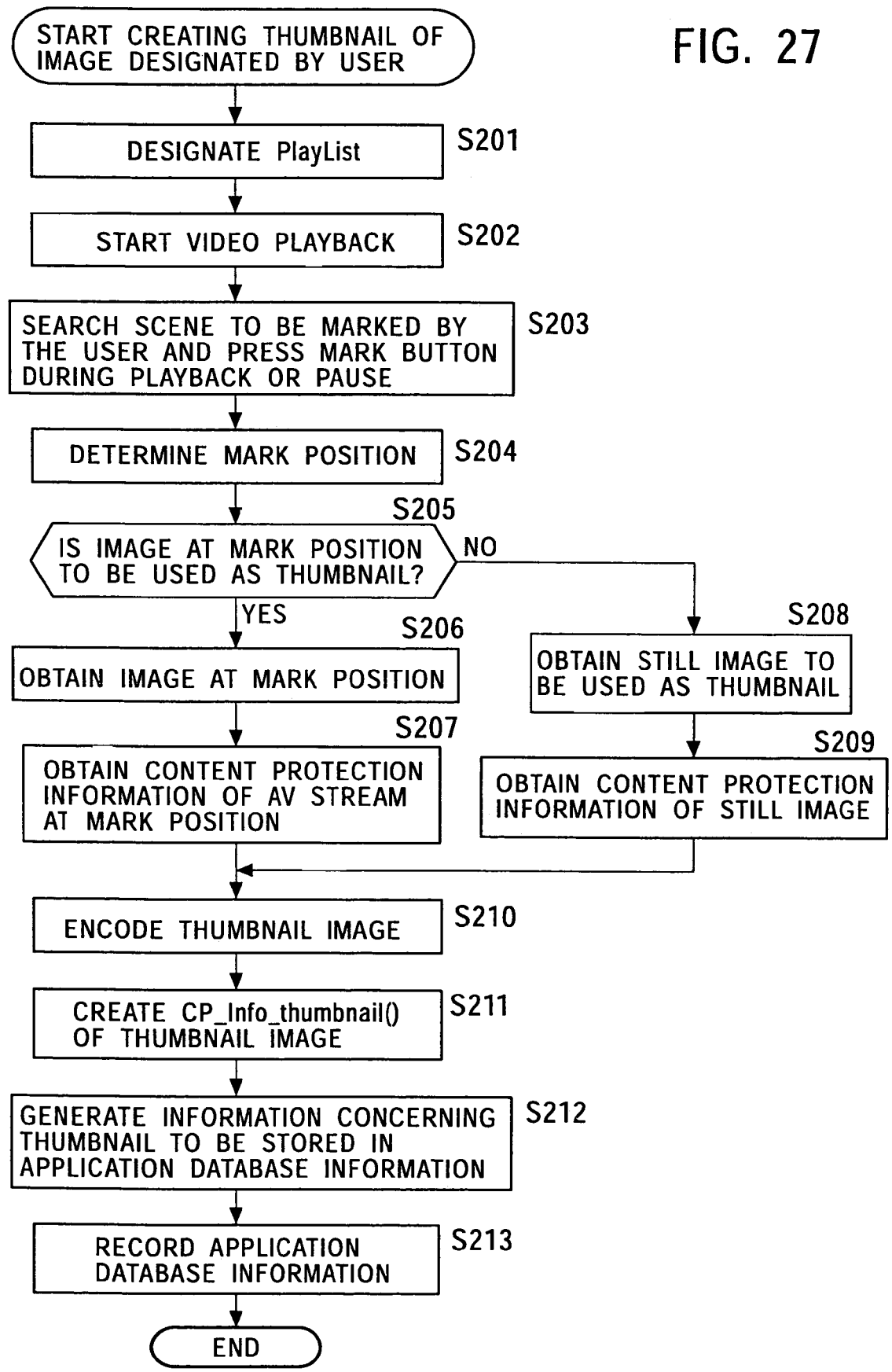
FIG. 27 is a flowchart illustrating processing for creating a thumbnail of an image designated by the user.

The flowchart illustrating processing for adding a thumbnail of an image designated by the user to a recorded AV stream and recording the thumbnail is shown in FIG. 27.

In step S201, when the user designates a PlayList to be played back, the controller 69 inputs this instruction.

In step S202, the controller 69 controls the drive 74 to play back the video signal of the designated PlayList from the information recording medium 75. The playback signal undergoes processing in the demodulator 73, the ECC decoder 72, the descrambler 71, the source depacketing/separating unit 66, the MPEG2AV decoder 65, the CGMS inserting unit 64, and the macrovision inserting unit 63, and is then output from a terminal 62 (video signal) and a terminal 70 (audio signal).

In step S203, the user searches a scene to be marked, and presses a mark button during a playback operation or a pause. The signal corresponding to this operation is input into the controller 69 via the terminal 61.

In step S204, the controller 69 determines the position output and displayed as the mark position at a time when the mark was input in the processing of step S203.

In step S205, the controller 69 outputs a message from the terminal 62, and requests the user to select whether the image at the mark position is to be used as the thumbnail or a still image to be used as the thumbnail is obtained from the terminal 85. The user inputs the selection from the terminal 61 based on this request. In step S205, the controller 69 determines based on this selection whether the image at the mark position is to be used as the thumbnail.

If the image at the mark position is used as the thumbnail, the process proceeds to step S206. In step S206, the controller 69 obtains the image at the mark position from the output of the MPEG2AV decoder 65, and supplies it to the thumbnail encoder 67.

In step S207, the controller 69 obtains the content protection information of the AV stream at the mark position from the output of the source depacketing/separating unit 66.

In contrast, if it is determined in step S205 that the image at the mark position is not used as the thumbnail, the controller 69 proceeds to step S208 in which a still image to be used as the thumbnail is obtained from the terminal 85. Then, in step S209, the controller 69 obtains the content protection information of the still image from the output of the content protection information detector 86.

After the processing of step S207 or step S209, the process proceeds to step S210 in which the controller 69 causes the thumbnail encoder 67 to encode the thumbnail image.

In step S211, the controller 69 creates the CP_Info_thumbnail( ) of the thumbnail image. More specifically, as discussed above, the controller 69 determines the values of the CCI_thumbnail, the APS_thumbnail, and the flag_need_AvstreamInfo.

In step S212, the controller 69 generates information concerning the thumbnail to be stored in the application database information.

In step S213, the controller 69 records the application database information into the information recording medium 75 in a manner similar to the method described above.

Figure 28:
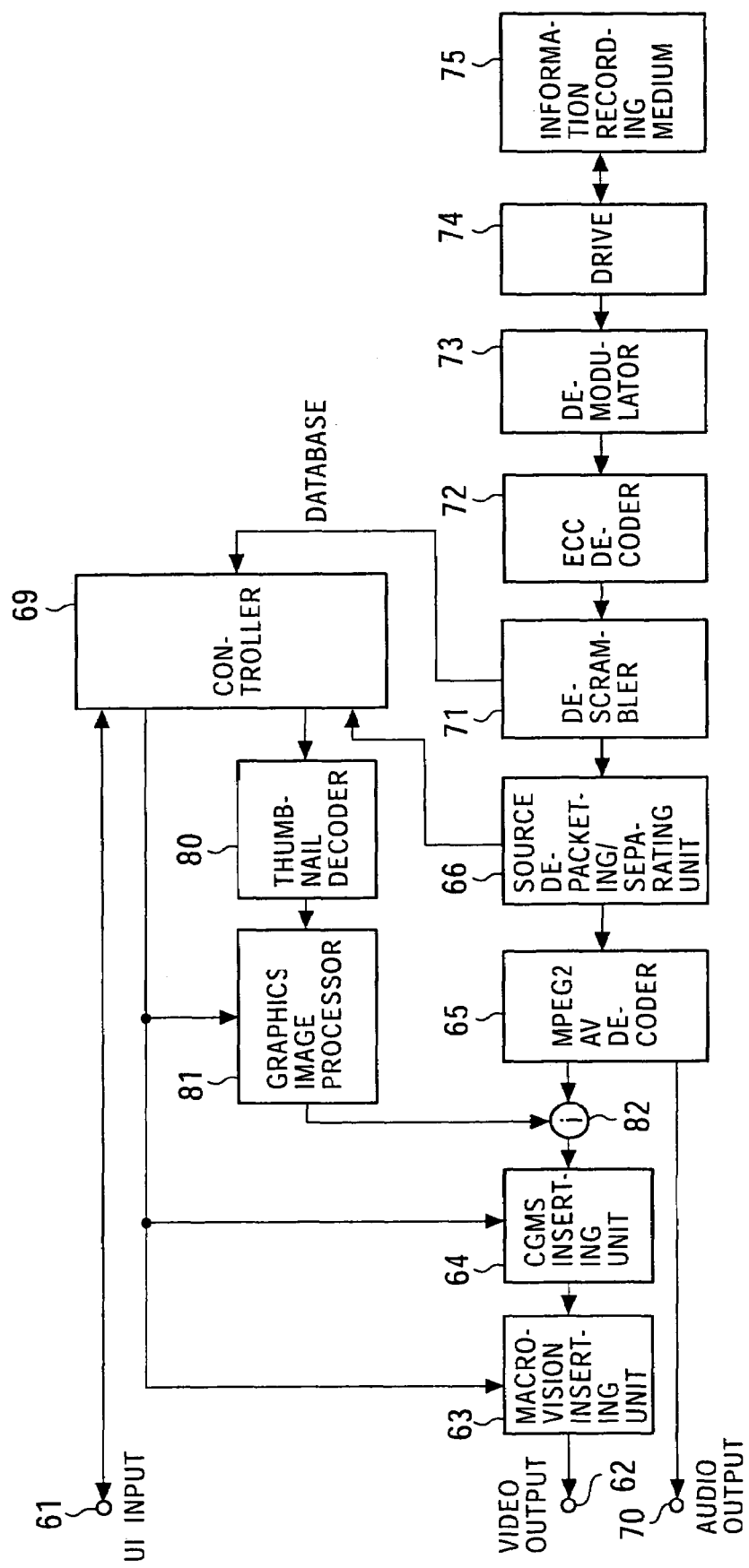
FIG. 28 is a block diagram illustrating an example of the configuration of a playback apparatus.

FIG. 28 is a block diagram illustrating a playback apparatus for playing back AV streams and also for playing back thumbnails, such as typical images or characteristic-mark images, of the AV streams.

An application database read from an information recording medium 75 via a drive 74 undergoes processing in a demodulator 73, an ECC decoder 72, and a descrambler 71, and is then input into a controller 69.

The controller 69 determines a thumbnail image to be displayed on a video output. For example, the controller 69 determines that a thumbnail of a typical image of a certain PlayList is to be displayed.

The controller 69 obtains the CP_Info_thumbnail( ) of the thumbnail image to be played back. If the flag_need_AVstreamInfo indicates 1, it is necessary to read from the information recording medium 75 the content protection information (DTCP descriptor, etc.) of the image in the Clip AV stream designated by the mark_time_stamp of the mark related to the thumbnail image.

The controller 69 inputs the thumbnail image to a thumbnail decoder 80, and inputs the decoded image to a graphics image processor 81. If the flag_need_AvstreamInfo for the thumbnail image indicates 1, it is necessary to impose playback restrictions on the thumbnail according to the read content protection information. For example, if the content protection information has information concerning resolution restrictions imposed when video content is played back in analog format, playback restrictions must be imposed on the thumbnail according to the resolution restrictions. The image output from the graphics image processor 81 is processed in an image blender processor 82, and is input into a CGMS inserting unit 64.

The CGMS inserting unit 64 inserts a CGMS signal, which means the same as the CCI_thumbnail of the CP_Info_thumbnail( ) for the thumbnail, into the output image. Then, a macrovision inserting unit 63 inserts an analog copy protection signal, which means the same as the APS_thumbnail of the CP_info_thumbnail( ), into the output image. The video is then output from the terminal 62.

Figure 29:
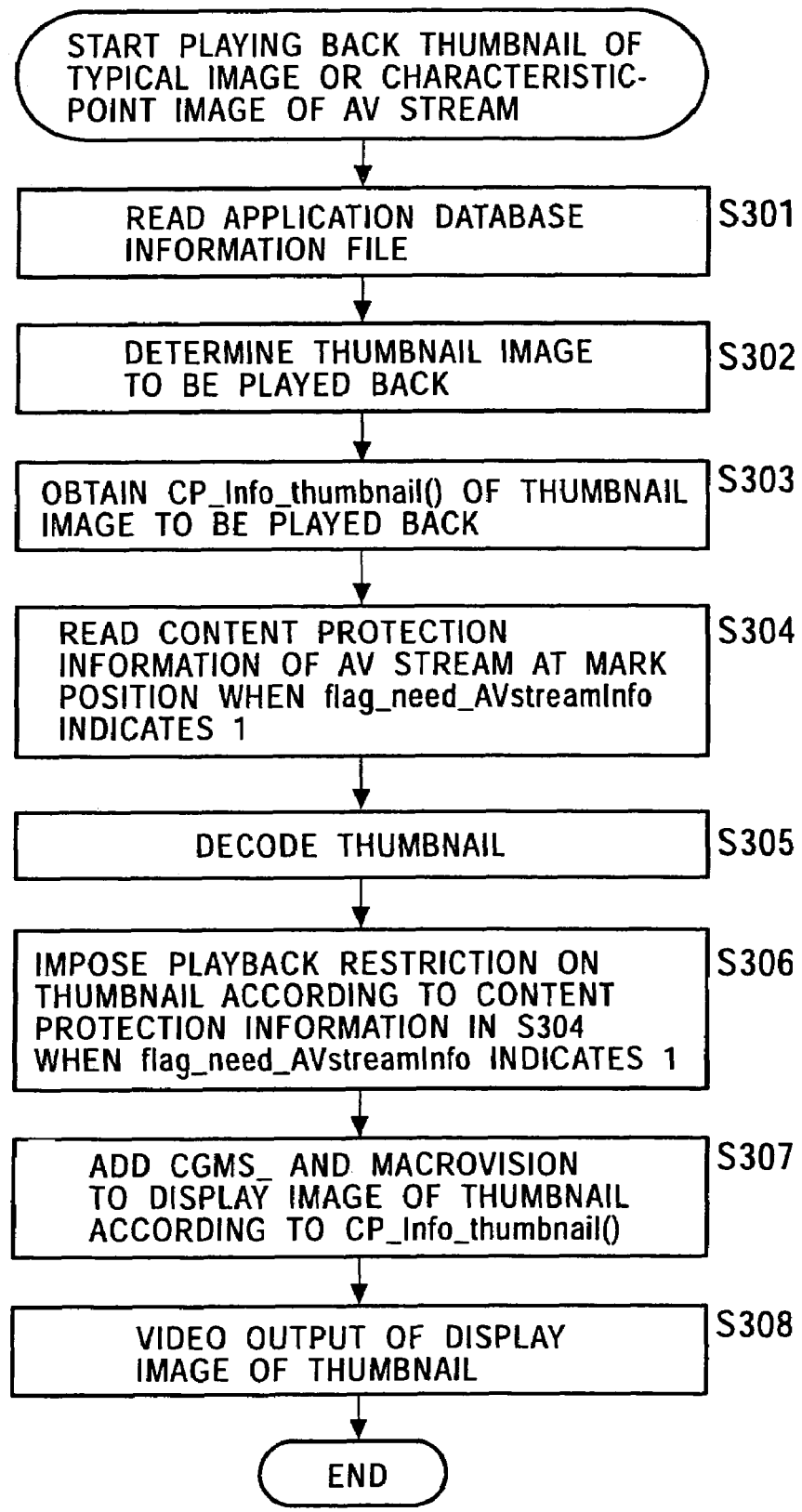
FIG. 29 is a flowchart illustrating processing for playing back a thumbnail of a typical image or a characteristic-point image of an AV stream.

The flowchart illustrating a playback operation for playing back thumbnails of typical images and characteristic-point images of AV streams is shown in FIG. 29.

In step S301, the controller 69 reads an application database information file. That is, the data read from the information recording medium 75 via the drive 74 undergoes processing in the demodulator 73 and the ECC decoder 72, and is supplied to the descrambler 71. The data is descrambled in the descrambler 71. The controller 69 then obtains the application database information file from the output of the descrambler 71.

The data output from the descrambler 71 undergoes processing in the source depacketing/separating unit 66, the MPEG2AV decoder 65, the image blender processor 82, the CGMS inserting unit 64, and the Macrovision inserting unit 63, and is then output from the terminals 62 and 70.

In step S302, the controller 69 determines a thumbnail image to be played back from the instruction input by the user from the terminal 61.

In step S303, the controller 69 obtains the CP_Info_thumbnail ( ) of the thumbnail image to be played back.

In step S304, the controller 69 determines whether the flag_need_AVstreamInfo is 1, and if so, the controller 69 reads the content protection information of the AV stream at the mark position. In step S305, the descrambler 71 decodes (descrambles) the thumbnail.

In step S306, if the flag_need_AVstreamInfo is 1, the controller 69 imposes playback restrictions on the thumbnail according to the content protection information read in the processing of step S304. For example, if the content protection information defines that the resolution when video content is played back in analog format is restricted, the controller 69 controls the graphics image processor 81 to restrict the resolution of the thumbnail. The graphics image processor 81 may reduce the image frame of the thumbnail based on the control of the controller 69.

In step S307, the controller 69 controls the CGMS inserting unit 64 and the Macrovision inserting unit 63 to add the CGMS and the Macrovision (analog copy protection signal (CAPS)) to the display image of the thumbnail according to the CP_Info_thumbnail( ). This addition processing is also one type of restriction.

In step S308, the controller 69 outputs the display video image of the thumbnail from the terminal 62.

Figure 30:
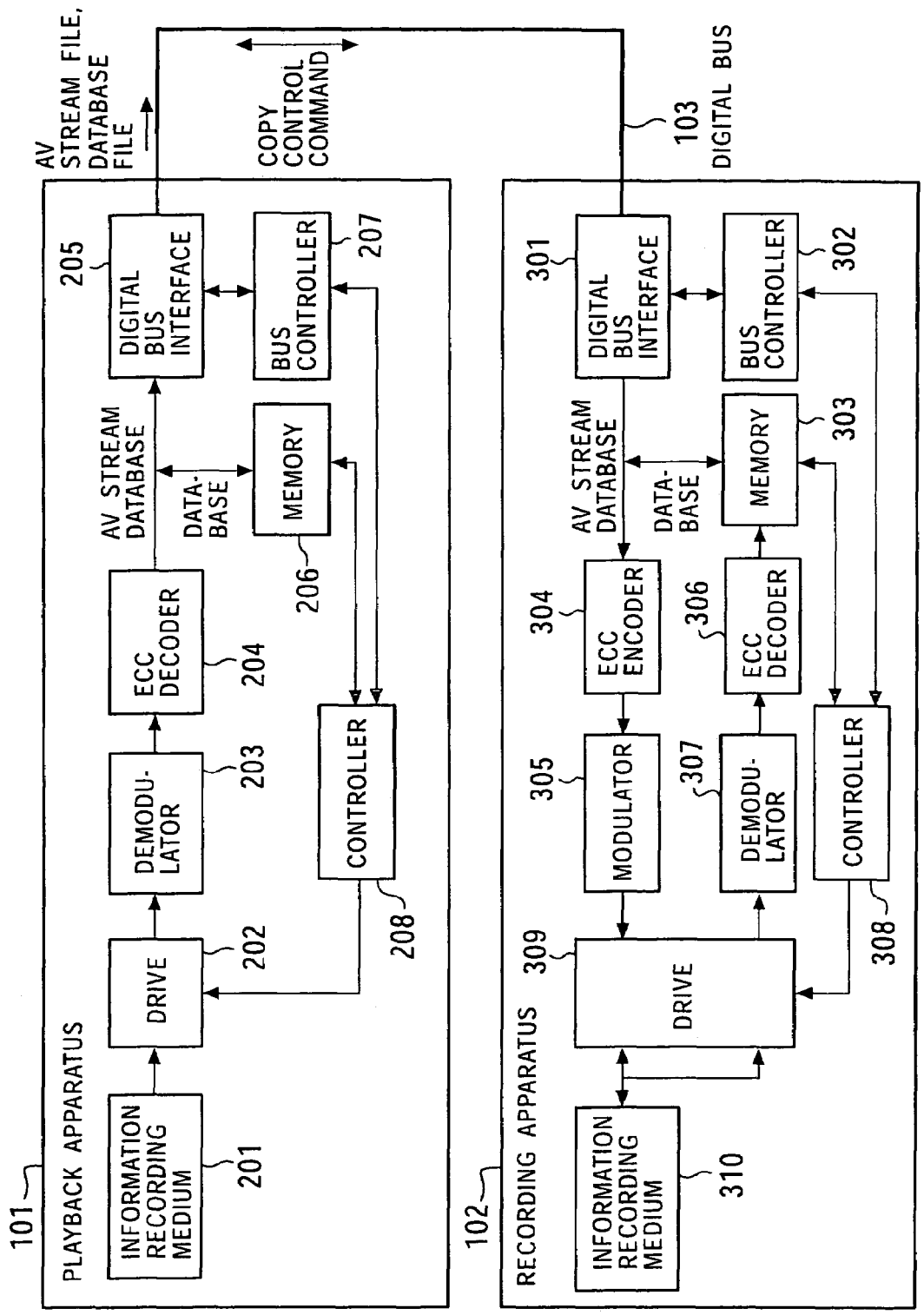
FIG. 30 is a block diagram illustrating the configuration when a database file is copied from a playback apparatus to a recording apparatus.

FIG. 30 is a block diagram illustrating a configuration when an AV stream file of DVR and the related database file are copied from a playback apparatus 101, which is a copy source (output apparatus), to a recording apparatus 102, which is a copy destination (input apparatus), via a digital bus 103.

Information, contained in a copy control command, indicating an instruction to copy a desired PlayList recorded in an information recording medium 201 of the playback apparatus 101 into an information recording medium 310 of the recording apparatus 102, is input into the playback apparatus 101 via a user interface (not shown). This command is input into a controller 208 via a digital bus interface 205 and a bus controller 207.

The controller 208 determines the stream portion of the AV stream required for playing back the above-described PlayList, and instructs a drive 202 to read the AV stream data from the information recording medium 201. The controller 208 also instructs the drive 202 to read the database file (PlayList file, Clip Information file, and thumbnail file) related to the PlayList from the information recording medium 201.

The controller 208 gives an instruction to supply the AV stream data, which has been read after being subjected to processing in a demodulator 203 and an ECC decoder 204, to a digital bus interface 205 as an AV stream file.

Meanwhile, the database file corresponding to the AV stream data read from the information recording medium 201 is input into a memory 206 via the demodulator 203 and the ECC decoder 204. The controller 208 creates databases (Clip Information file and PlayList file) required for playing back the AV stream file output from the digital bus interface 205 based on the data stored in the memory 206. The controller 208 also creates a Clip associated with the AV stream file and a thumbnail file used by the PlayList file to be copied.

The controller 208 then gives an instruction to supply the newly created database files (Clip Information file, PlayList file, and thumbnail file) from the memory 206 to the digital bus interface 205.

The bus controller 207 controls the output of the files from the digital interface 205. The controller 208 instructs the bus controller 207 to output the AV stream file and the database file from the digital bus interface 205.

The AV stream file and the database file are input into the recording apparatus 102, which is the copy destination, via the digital bus 103.

A bus controller 302 of the recording apparatus 102, which is the copy destination, controls the input of files from a digital bus interface 301. The bus controller 302 and the bus controller 207 control the data transmission/reception timings by exchanging the file copy control commands.

A controller 308 of the recording apparatus 102 gives an instruction to record the AV stream file input into the digital bus interface 301 into the information recording medium 310 after processing the AV stream file in an ECC encoder 304, a modulator 305, and a drive 309.

The controller 308 also gives an instruction to write the database files input into the digital bus interface 301 into a memory 303.

The controller 308 also gives an instruction to read the database files (info.dvr file and thumbnail file) recorded in the information recording medium 310 into the memory 303 after processing the database files in the drive 309, a demodulator 307, and an ECC decoder 306.

The controller 308 updates the info.dvr file and the thumbnail file stored in the memory 303. More specifically, the controller 308 adds the name of the PlayList file to be recorded to the TableOfPlayList of the Info.dvr file stored in the copy destination, and adds the thumbnail to be recorded to the thumbnail file stored in the copy destination.

The controller 308 gives an instruction to read the database files from the memory 303, and to record them into the information recording medium 310 after processing the database files in the ECC encoder 304, the modulator 305, and the drive 309.

Figure 31:
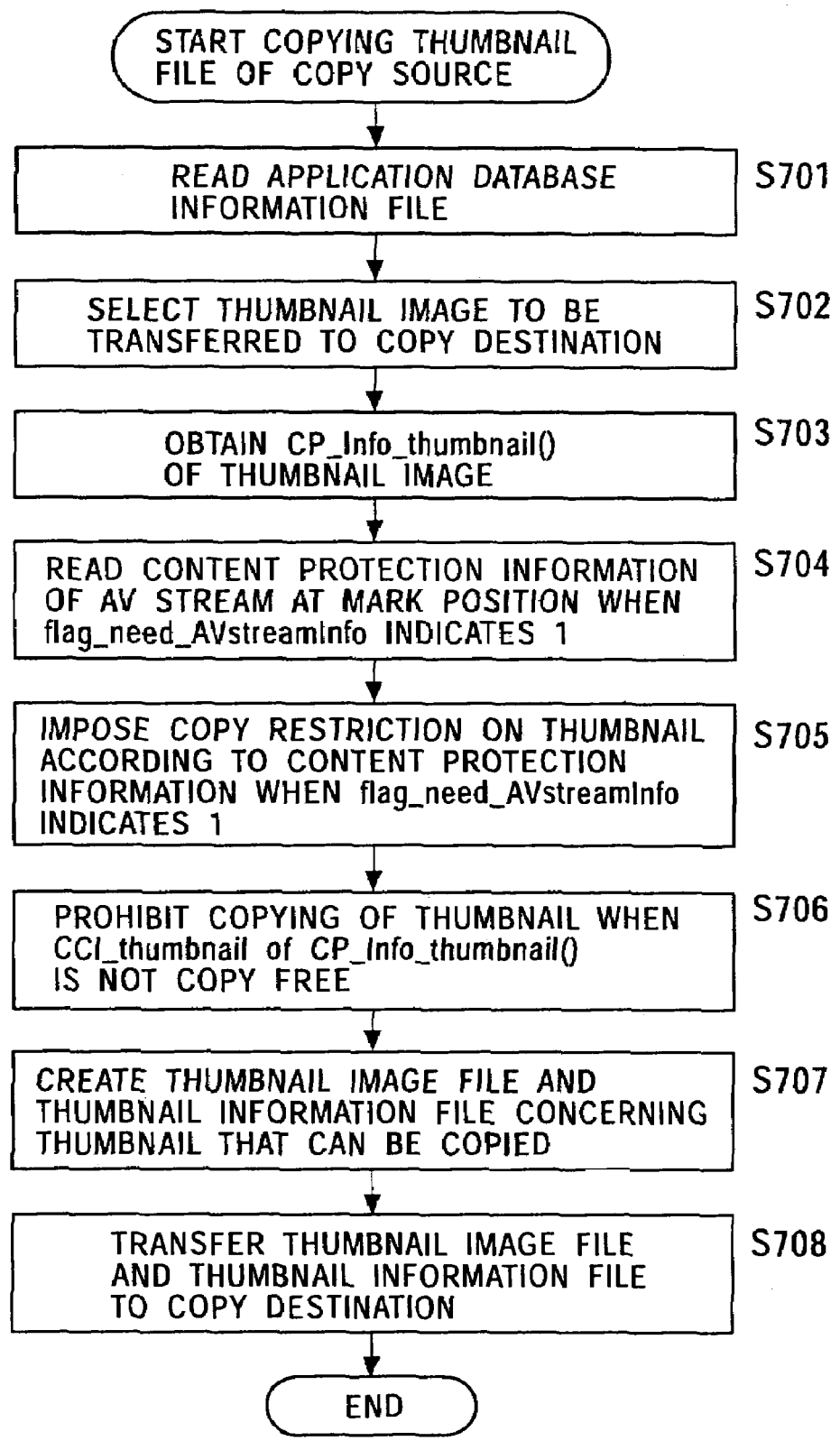
FIG. 31 is a flowchart illustrating processing performed by a copy source of a thumbnail file.

FIG. 31 is a flowchart illustrating the processing performed by a copy source when a thumbnail image is copied from the playback apparatus 101, which is the copy source (output apparatus), into the recording apparatus 102, which is the copy destination (input apparatus).

In step S701, the controller 208 reads the application database information file (FIG. 13). That is, the controller 208 controls and instructs the drive 202 to read the application database information file from the information recording medium 201. The application database information file read from the information recording medium 201 is supplied to and stored in the memory 206 after undergoing processing in the demodulator 203 and the ECC decoder 204. The controller 208 then reads the application database information file stored in the memory 206.

In step S702, the controller 208 selects a thumbnail image to be transferred to the copy destination based on the instruction from the user.

In step S703, the controller 208 obtains the CP_Info_thumbnail( ) (FIGS. 16 and 17) of the above-described thumbnail image selected in step S702 from the application database information file (menu.tidx/mark.tidx) stored in the memory 206.

In step S704, the controller 208 determines whether the flag_need_AvstreamInfo (FIG. 17) is 1, and if so, the controller 208 reads the content protection information of the AV stream at the mark position.

In step S705, the controller 208 determines whether the flag_need_AvstreamInfo (FIG. 17) is 1, and if so, the controller 208 imposes copy restrictions on the thumbnail according to the content protection information. For example, if the content protection information has information concerning the period for which copying can be made, the controller 208 imposes copy restrictions on the thumbnail based on the period information.

In step S706, if the CCI_thumbnail (FIG. 17) of the CP_Info_thumbnail( ) is not copy free, the controller 208 prohibits the thumbnail from being copied.

In step S707, the controller 208 creates a thumbnail image file (menu.tdat/mark.tdat) and a thumbnail information file (menu.tidx/mark.tidx) concerning a thumbnail image that can be copied.

In step S708, the controller 208 transfers the thumbnail image file and the thumbnail information file to the copy destination.

As described above, according to the present invention, when recording an AV stream and also recording a thumbnail image representing a typical image or a characteristic point of the AV stream, content protection information can be added to the thumbnail image and is then recorded.

The content protection information includes at least one of the copy generation management information (CCI) and the analog copy protection information (APS).

For example, when a thumbnail image is created by using an image at a characteristic point of an AV stream, content protection information of the thumbnail image can be generated based on the content protection information for the image at the above-described characteristic point of the AV stream.

When the thumbnail image is created from an image in the AV stream, the content protection information of the thumbnail image contains an identifier (flag_need_AvstreamInfo) indicating whether it is necessary to refer to the content protection information of the AV stream. This makes it possible to deal with the situation where information other than CCI and APS is necessary as the content protection information of the thumbnail image.

As discussed above, since a thumbnail image is recorded by adding the content protection information thereto, the copyright of the thumbnail can be protected.

Thumbnail images and the content protection information thereof are recorded in units of blocks (tn_block) having a predetermined size. Accordingly, the addition and partial deletion of the thumbnails can be performed easily and fast.

If the content protection information is stored after the thumbnail image, the start position of the content protection information in the above-described block can be randomized since the size of the thumbnail image is variable. This makes it effectively difficult to extract the content protection information from the thumbnail image file.

JPEG is used as the format of the thumbnail image. Since JPEG is widely used as the de facto standard, the implementation of the format is relatively easy, and high compatibility is ensured. The format of the thumbnail image is not restricted to JPEG, and I-picture of MPEG, PNG, GIF, TIFF, etc. may be used.

In the present invention, in an information recording medium in which an AV stream and a thumbnail image representing a typical image or a characteristic point of the AV stream are recorded, when the thumbnail image is played back from the information recording medium, playback restrictions are imposed on the thumbnail image based on the content protection information recorded in and added to the thumbnail image. That is, a copy generation management signal or an analog copy protection signal is added to a playback signal to play back the playback signal. Playback restrictions are also imposed on the thumbnail image based on the content protection information of the AV stream. Accordingly, illegal copying of the thumbnail image can be prevented.

In the present invention, in an information recording medium of a playback apparatus in which an AV stream and a thumbnail image representing a typical image or a characteristic point of the AV stream are recorded, when the AV stream and the thumbnail image are copied into another information recording medium, copy restrictions are imposed on the thumbnail image based on the content protection information recorded in and added to the thumbnail image. That is, it is determined whether to copy the thumbnail image so that restrictions of the copy generation management information (CCI) of the thumbnail image can be protected. Copy restrictions are also imposed on the thumbnail image based on the content protection information of the AV stream.

Accordingly, an application for copying a thumbnail image together with the corresponding video signal can be implemented while protecting the copyright of the thumbnail image. This is more effective compared to the case in which only AV streams can be copied since the need for the user to add a thumbnail image to the copied AV stream later is eliminated.

The above-described series of processings can be executed by hardware or software.

If software is used for executing the processings, programs forming the software are installed via a network or a recording medium into a computer built into dedicated hardware or into a general-purpose computer which can implement various functions by installing various programs.

This recording medium may be formed of package media, which are distributed separately from the apparatus for supplying the programs to the user, consisting of a magnetic disk (including a floppy disk), an optical disc (including a CD-ROM (Compact Disk-Read Only Memory) and a DVD (Digital Versatile Disc)), an magneto-optical disk (including MD (Mini-Disk) (trade name)), or a semiconductor memory. Alternatively, the recording medium may be formed of a ROM or a hard disk storing the programs therein, which are supplied to the user while being integrated in the apparatus.

In this specification, the steps of the programs stored in the recording medium may include processing executed in a time-series manner according to the order included therein, and may also include processing executed concurrently or individually.

According to the first video signal processing apparatus and method, the first recording medium, and the first program of the present invention, a thumbnail image corresponding to an obtained video signal is generated, and content protection information corresponding to the generated thumbnail image is generated. The content protection information is added to the thumbnail image, and the thumbnail image is then recorded in an information recording medium.

Thus, the copyright of the thumbnail images can be protected.

According to the second video signal processing apparatus and method, the second recording medium, and the second program of the present invention, a video signal, a thumbnail image corresponding to the video signal, and content protection information added to the thumbnail image are extracted from a signal played back from an information processing medium, and the output of the thumbnail image is restricted based on the extracted content protection information.

Thus, illegal copying of the thumbnail images can be prevented.

According to the information recording medium of the present invention, a video signal, a thumbnail image corresponding to the video signal, and content protection information corresponding to the thumbnail image are recorded. It is thus possible to provide an information recording medium in which illegal copying of thumbnail images can be prevented.

According to the video recording apparatus and method, and the third program of the present invention, content protection information is detected from an input video signal, a thumbnail image signal corresponding to the video signal is generated, copy control information of the thumbnail image is generated based on the detected content protection information, and the video signal, the thumbnail image signal, and the copy control information are recorded into an information recording medium.

Thus, information can be recorded into an information recording medium so that illegal copying of thumbnail images can be prevented.

According to the video playback apparatus and method, and the fourth program of the present invention, a video signal, a thumbnail image signal corresponding to the video signal, and copy control information of the thumbnail image signal are played back from an information recording medium, and a copy control signal is added to the thumbnail image signal based on the played back copy control information, and then, the thumbnail image signal with the copy control signal is output.

Thus, information in which illegal copying of thumbnail images can be prevented can be played back from an information recording medium.

The invention claimed is:

1. A video signal processing apparatus comprising:
generation means for generating a thumbnail image corresponding to an input video signal;
first control means for generating content protection information corresponding to the thumbnail image generated by said generation means; and
recording means for recording the video signal into an information recording medium together with the thumbnail image generated by said generation means and the content protection information generated by said first control means.

2. A video signal processing apparatus according to claim 1, wherein the content protection information comprises copy generation management information.

3. A video signal processing apparatus according to claim 1, wherein the content protection information comprises analog copy protection control information.

4. A video signal processing apparatus according to claim 1, wherein said generation means generates the thumbnail image by using an image in the video signal, and said first control means generates the content protection information of the thumbnail image based on content protection information of the image contained in the video signal.

5. A video signal processing apparatus according to claim 1, wherein said generation means generates the thumbnail image by using an image in the video signal, and said first control means generates the content protection information containing an identifier indicating whether it is necessary to refer to content protection information of the video signal.

6. A video signal processing apparatus according to claim 1, wherein said recording means records the thumbnail image and the content protection information in units of blocks having a predetermined size.

7. A video signal processing apparatus according to claim 1, wherein said recording means forms the thumbnail image and the content protection information corresponding to the thumbnail image into a block as a pair, and records the block.

8. A video signal processing apparatus according to claim 1, wherein said recording means records the thumbnail image by compressing the thumbnail image according to a JPEG method.

9. A video signal processing apparatus according to claim 1, further comprising:
playback means for playing back a signal recorded in the information recording medium;
separation means for separating the video signal, the thumbnail image corresponding to the video signal, and the content protection information corresponding to the thumbnail image from the signal played back by said playback means; and second control means for restricting an output of the thumbnail image based on the content protection information separated by said separation means.

10. A video signal processing apparatus according to claim 9, wherein the content protection information comprises an analog copy protection control signal, and said second control means performs control, so that a copy protection signal is superimposed on an output signal according to the analog copy protection control signal.

11. A video signal processing apparatus according to claim 9, wherein said second control means further restricts a playback operation of the thumbnail, image based on the content protection information of the video signal.

12. A video signal processing apparatus according to claim 9, wherein, when the thumbnail image is copied into another information recording medium, said second control means restricts the copying of the thumbnail image based on the content protection information recorded in and added to the thumbnail image.

13. A video signal processing apparatus according to claim 12, wherein the content protection information comprises copy generation management information, and said second control means restricts the copying of the thumbnail image so that restrictions of the copy generation management information of the thumbnail image are protected.

14. A video signal processing apparatus according to claim 12, wherein said second control means further restricts the copying of the thumbnail image based on the content protection information of the video signal.

15. A video signal processing method comprising:
a generation step of generating a thumbnail image corresponding to an input video signal;
a control step of generating content protection information corresponding to the thumbnail image generated by processing of said generation step; and
a recording step of recording the video signal into an information recording medium together with the thumbnail image generated by processing of said generation step and the content protection information generated by processing of said control step.

16. A computer readable medium encoded with a computer program, the computer program comprising:
a generation step of generating a thumbnail image corresponding to an input video signal;
a control step of generating content protection information corresponding to the thumbnail image generated by processing of said generation step; and
a recording step of recording the video signal into an information recording medium together with the thumbnail image generated by processing of said generation step and the content protection information generated by processing of said control step.

17. A video signal processing apparatus comprising:
playback means for playing back a signal recorded in an information recording medium;
separation means for separating a video signal, a thumbnail image corresponding to the video signal, and content protection information corresponding to the thumbnail image from the signal played back by said playback means; and
control means for controlling an output of the thumbnail image based on the content protection information separated by said separation means.

18. A video signal processing apparatus according to claim 17, wherein the content protection information comprises an analog copy protection control signal, and said control means performs control so that a copy protection signal is superimposed on an output signal according to the analog copy protection control signal.

19. A video signal processing apparatus according to claim 17, wherein said control means further restricts a playback operation of the thumbnail image based on the content protection information of the video signal.

20. A video signal processing apparatus according to claim 17, wherein, when the thumbnail image is copied into another information recording medium, said control means restricts the copying of the thumbnail image based on the content protection information recorded in and added to the thumbnail image.

21. A video signal processing apparatus according to claim 20, wherein the content protection information comprises copy generation management information, and said control means restricts the copying of the thumbnail image so that restrictions of the copy generation management information of the thumbnail image are protected.

22. A video signal processing apparatus according to claim 20, wherein said control means further restricts the copying of the thumbnail image based on the content protection information of the video signal.

23. A video signal processing method comprising:
a playback step of playing back a signal recorded in an information recording medium;
a separation step of separating a video signal, a thumbnail image corresponding to the video signal, and content protection information corresponding to the thumbnail image from the signal played back by processing of said playback step; and
a control step of controlling an output of the thumbnail image based on the content protection information separated by processing of said separation step.

24. A computer readable medium encoded with a computer program, the computer program comprising:
a playback step of playing back a signal recorded in an information recording medium;
a separation step of separating a video signal, a thumbnail image corresponding to the video signal, and content protection information corresponding to the thumbnail image from the signal played back by processing of said playback step; and
a control step of controlling an output of the thumbnail image based on the content protection information separated by processing of said separation step.

25. A recording medium, readable by a playback apparatus, in which a video, a thumbnail image corresponding to the video, and content protection information corresponding to the thumbnail image are recorded.

26. The recording medium according to claim 25, wherein the content protection information comprises copy generation management information.

27. The recording medium according to claim 25, wherein the content protection information comprises an analog copy protection control signal.

28. The recording medium according to claim 25, wherein the thumbnail image and the content protection information are recorded in units of blocks having a predetermined size.

29. The recording medium according to claim 25, wherein the thumbnail image and the content protection information corresponding to the thumbnail image are recorded by being formed into a block as a pair.

30. The recording medium according to claim 25, wherein the thumbnail image is recorded by being compressed according to a JPEG method.

31. A video signal recording apparatus comprising:
a detector operable to detect content protection information from an input video signal;
an encoder operable to generate a thumbnail image signal corresponding to the video signal;
a generator operable to generate copy control information of the thumbnail image signal generated by said encoder based on the content protection information detected by said detector; and
a recorder operable to record the video signal, the thumbnail image signal generated by said encoder, and the copy control information generated by said generator into an information recording medium.

32. A video signal recording apparatus according to claim 31, further comprising an encryption unit operable to encrypt the thumbnail image signal, wherein said recorder records the thumbnail image signal encrypted by said encryption unit into the information recording medium.

33. A video signal recording apparatus according to claim 32, wherein said encryption unit further encrypts the copy control information, and said recorder records the copy control information encrypted by said encryption unit into the information recording medium.

34. A video signal recording method comprising:
detecting content protection information from an input video signal;
generating a thumbnail image signal corresponding to the video signal;
generating copy control information of the thumbnail image signal based on the detected content protection information; and
recording the video signal, the thumbnail image signal, and the copy control information into the information recording medium.

35. A computer readable medium encoded with a computer program allowing a computer to record a vided is recorded, said computer program comprising:
a detection step of detecting content protection information from an input video signal;
a first generation step of generating a thumbnail image signal corresponding to the video signal;
a second generation step of generating copy control information of the thumbnail image signal based on the content protection information detected by processing of said detection step; and
a recording control step of controlling the recording of the video signal, the thumbnail image signal generated by processing of said first generation step, and the copy control information generated by processing of said second generation step into the information recording medium.

36. A video signal playback apparatus comprising:
a playback unit operable to play back a video signal, a thumbnail image signal corresponding to the video signal, and copy control information of the thumbnail signal from an information recording medium; and
an output unit operable to add a copy control signal to the thumbnail image signal based on the copy control information played back by said playback unit so as to output the thumbnail image signal with the copy control signal.

37. A video playback apparatus according to claim 36, further comprising an encryption decoder operable to decode the thumbnail image signal, which is encrypted, wherein the thumbnail image signal played back by said playback unit is encrypted.

38. A video playback apparatus according to claim 37, wherein the copy control information played back by said playback unit is encrypted, and said encryption decoder further decodes the encrypted copy control information.

39. A video signal playback method comprising:
playing back a video signal, a thumbnail image signal corresponding to the video signal, and copy control information of the thumbnail signal from an information recording medium; and
adding a copy control signal to the thumbnail image signal based on the played-back copy control information so as to output the thumbnail image signal with the copy control signal.

40. A computer readable medium encoded with a computer program allowing a computer to record a vided is recorded, said computer program comprising:
a playback control step of controlling a playback operation of a video signal, a thumbnail image signal corresponding to the video signal, and copy control information of the thumbnail signal from an information recording medium; and
an output control step of controlling an output of information obtained by adding a copy control signal to the thumbnail image signal based on the copy control information which is controlled to be played back by processing of said playback control step.

* * * * *

UNITED STATES PATENT AND TRADEMARK OFFICE
CERTIFICATE OF CORRECTION

PATENT NO.       : 7,248,786 B2                                                   Page 1 of 1
APPLICATION NO. : 10/416659
DATED            : July 24, 2007
INVENTOR(S)      : Motoki Kato, Masanobu Nakamura and Katsumi Muramatsu It is certified that error appears in the above-identified patent and that said Letters Patent is hereby corrected as shown below:

Column 1, Line 28, replace "....proposed.  As" with --...proposed, as--

Column 3, Line 30, replace "records" with --record--

Column 7, Line 58, add a period at the end of "FIG. 10 illustrates the syntax of UIAppInfopoDVR"

Column 10, Line 58, replace "indicate" with --indicates--

Column 14, Line 59, replace "include" with --includes--

Column 27, Line 15, delete the comma

Column 29, Line 39, replaced "vided" with --video--

Column 30, Line 36, replace "vided" with --video--

Signed and Sealed this

Sixth Day of November, 2007

JON W. DUDAS
*Director of the United States Patent and Trademark Office*